United States Patent
Walz et al.

(10) Patent No.: US 9,126,266 B2
(45) Date of Patent: Sep. 8, 2015

(54) MACHINE TOOL

(75) Inventors: Jürgen Walz, Frickenhausen (DE);
Franco Rigolone, Ponteranica (IT);
Gottfried Deuringer, Gerestsried (DE);
Renato Rota, Carvico (IT); Manuel Gerst, Bielefeld (DE)

(73) Assignee: GILDEMEISTER Italiana S.p.A.,
Brembate di Sopra (IT)

( * ) Notice: Subject to any disclaimer, the term of this patent is extended or adjusted under 35 U.S.C. 154(b) by 64 days.

(21) Appl. No.: 14/122,607

(22) PCT Filed: May 18, 2012

(86) PCT No.: PCT/EP2012/059292
§ 371 (c)(1),
(2), (4) Date: Apr. 16, 2014

(87) PCT Pub. No.: WO2012/163701
PCT Pub. Date: Dec. 6, 2012

(65) Prior Publication Data
US 2014/0298961 A1    Oct. 9, 2014

(30) Foreign Application Priority Data

May 31, 2011   (DE) .......................... 10 2011 076 834
May 31, 2011   (DE) .......................... 10 2011 076 835
Jun. 15, 2011   (DE) .......................... 10 2011 077 571

(51) Int. Cl.
*B23Q 39/02*   (2006.01)
*B23B 3/30*    (2006.01)
(Continued)

(52) U.S. Cl.
CPC ................. *B23B 3/167* (2013.01); *B23B 3/168* (2013.01); *B23B 3/30* (2013.01); *B23Q 39/026* (2013.01); *B23Q 2039/004* (2013.01); *B23Q 2039/008* (2013.01); *Y10T 82/2508* (2015.01)

(58) Field of Classification Search
CPC .......... B23Q 39/026; B23Q 1/62; B23Q 3/06; B23Q 3/167; B23Q 3/30
See application file for complete search history.

(56) References Cited

U.S. PATENT DOCUMENTS 5,127,140 A * 7/1992 Oiwa et al. ..................... 29/27 C
5,704,262 A * 1/1998 Baumbusch et al. ........... 82/124
(Continued)

FOREIGN PATENT DOCUMENTS

DE      DD 279 429 A1    6/1990
DE      195 28 404 A1    2/1997
(Continued)

OTHER PUBLICATIONS

DE 10 2011 076 837.8—German Examination Report with English translation, dated Jun. 12, 2012, 13 pages.
(Continued)

*Primary Examiner* — Will Fridie, Jr.
(74) *Attorney, Agent, or Firm* — Blakely Sokoloff Taylor & Zafman LLP

(57) ABSTRACT

The present invention relates to a machine tool, in particular a lathe, comprising a machine frame 1 having a first carrier side TS1 and a second carrier side TS2, wherein the machine frame 1 includes a first carrier portion 1a, a second carrier portion 1b and a middle carrier portion 1c which is arranged between the first and second carrier portions, a first spindle carrier 31 which is arranged on the first carrier side TS1 of the first carrier portion 1a and which holds a first work spindle 21, a first spindle carrier slide 42 which is arranged on the first or second carrier side of the second carrier portion 1b and on which a second spindle carrier 32 is arranged which holds a second work spindle 22 facing the first work spindle 21, wherein the spindle axes are aligned in parallel, in particular coaxially, and wherein the second spindle carrier 32 can be moved in direction W parallel to the spindle axes, and a second tool carrier slide 52 which is arranged on the first carrier side TS1 of the middle portion 1c and on which a tool carrier 62 for tools is arranged, wherein the second tool carrier slide 52 is arranged on the first carrier side TS1 between the first spindle carrier 31 and the second spindle carrier 32.

24 Claims, 17 Drawing Sheets

(51) Int. Cl.
*B23B 3/16* (2006.01)
*B23Q 39/00* (2006.01)

(56) References Cited

U.S. PATENT DOCUMENTS

| | | | |
|---|---|---|---|
| 6,640,677 B2* | 11/2003 | Ueda et al. | 82/129 |
| 6,758,117 B2* | 7/2004 | Baumann et al. | 82/117 |
| 6,948,411 B2* | 9/2005 | Grossmann | 82/129 |
| 7,039,992 B2* | 5/2006 | Tokuma et al. | 29/27 C |
| 7,987,567 B2* | 8/2011 | Yasuda et al. | 29/27 C |

FOREIGN PATENT DOCUMENTS

| | | |
|---|---|---|
| DE | 19 959 961 A1 | 6/2001 |
| DE | 10 116 994 A1 | 10/2002 |
| DE | 10 2006 015 078 A1 | 11/2006 |
| DE | 10 2006 013 783 A1 | 12/2006 |
| DE | 10 2006 026 184 A1 | 12/2007 |
| DE | 10 2011 076 834 | 12/2012 |
| EP | 0 999 002 A1 | 5/2000 |
| EP | 1 160 052 A1 | 12/2001 |
| EP | 1 897 640 A1 | 3/2008 |
| EP | 2 058 071 A1 | 5/2009 |

OTHER PUBLICATIONS

PCT/EP2012/059287; International Search Report and English translation of Written Opinion, mail date Aug. 10, 2012, 19 pages.
PCT/EP2012/059287; English translation of International Preliminary Report on Patentability, issued Dec. 2, 2013, 12 pages.
DE 10 2011 076 835.1—German Office Action with English translation, issued Jun. 12, 2012, 11 pages.
DE 10 2011 076 834.3—German Office Action with English translation, issued Jun. 14, 2012, 11 pages.
DE 10 2011 077 571.4—German Examination Report with English translation, dated Jun. 15, 2012, 8 pages.
PCT/EP2012/059282; English translation of International Preliminary Report on Patentability, issued Dec. 2, 2013, 6 pages.
PCT/EP2012/059284; English translation of International Preliminary Report on Patentability, issued Dec. 2, 2013, 9 pages.
PCT/EP2012/059292; English translation of International Preliminary Report on Patentability, issued Dec. 2, 2013, 11 pages.

* cited by examiner

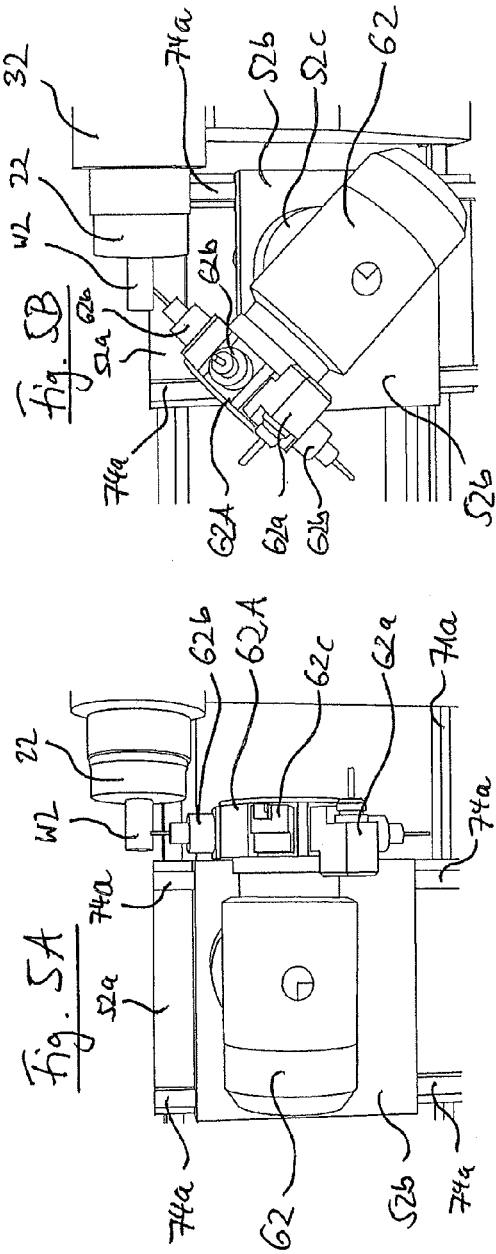
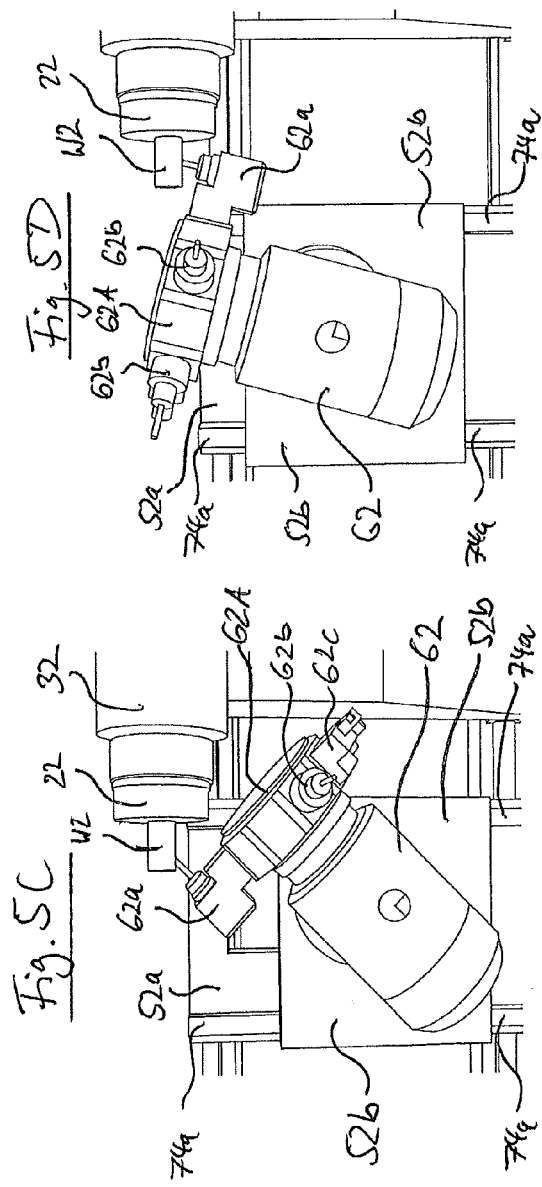

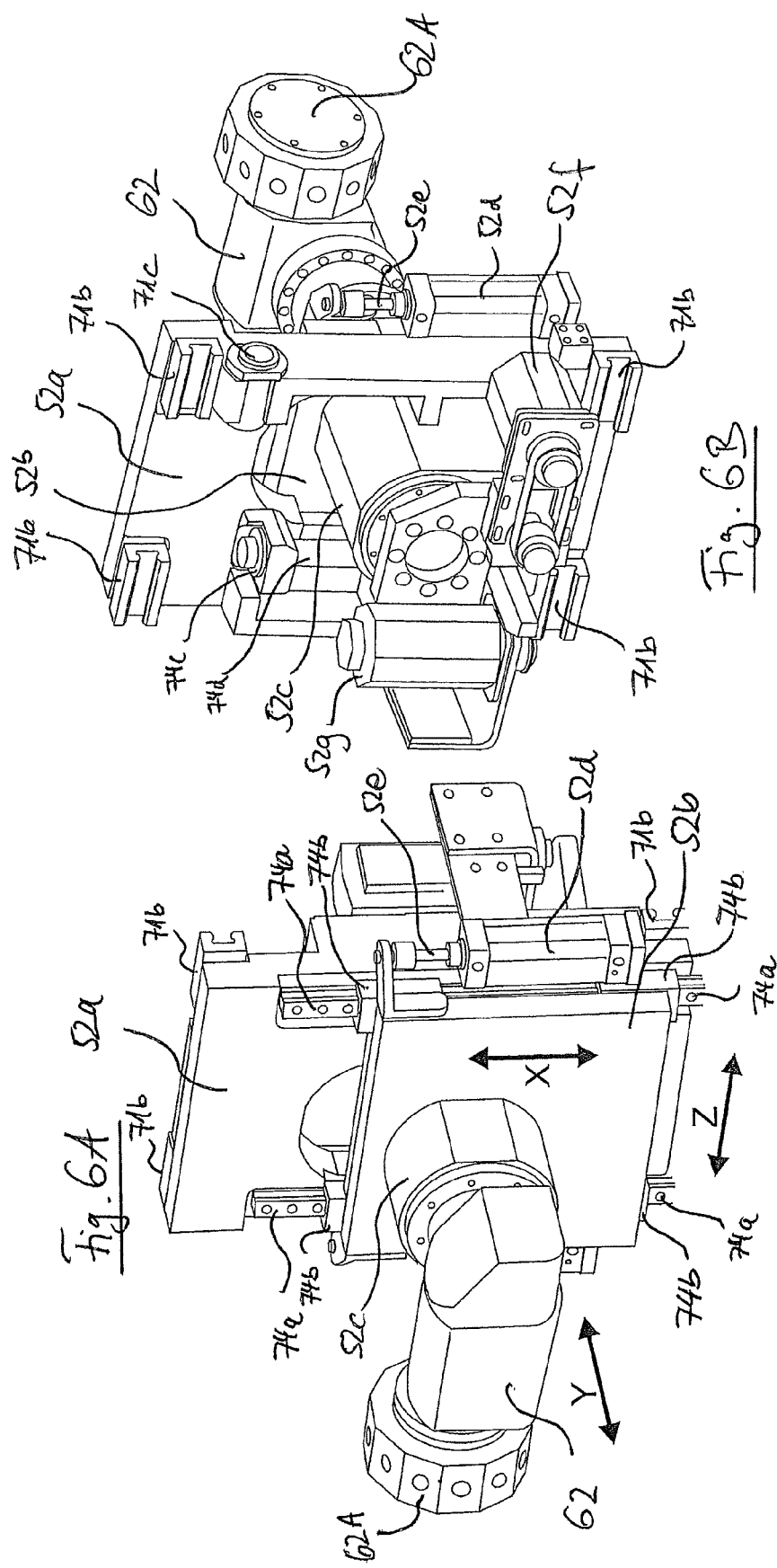

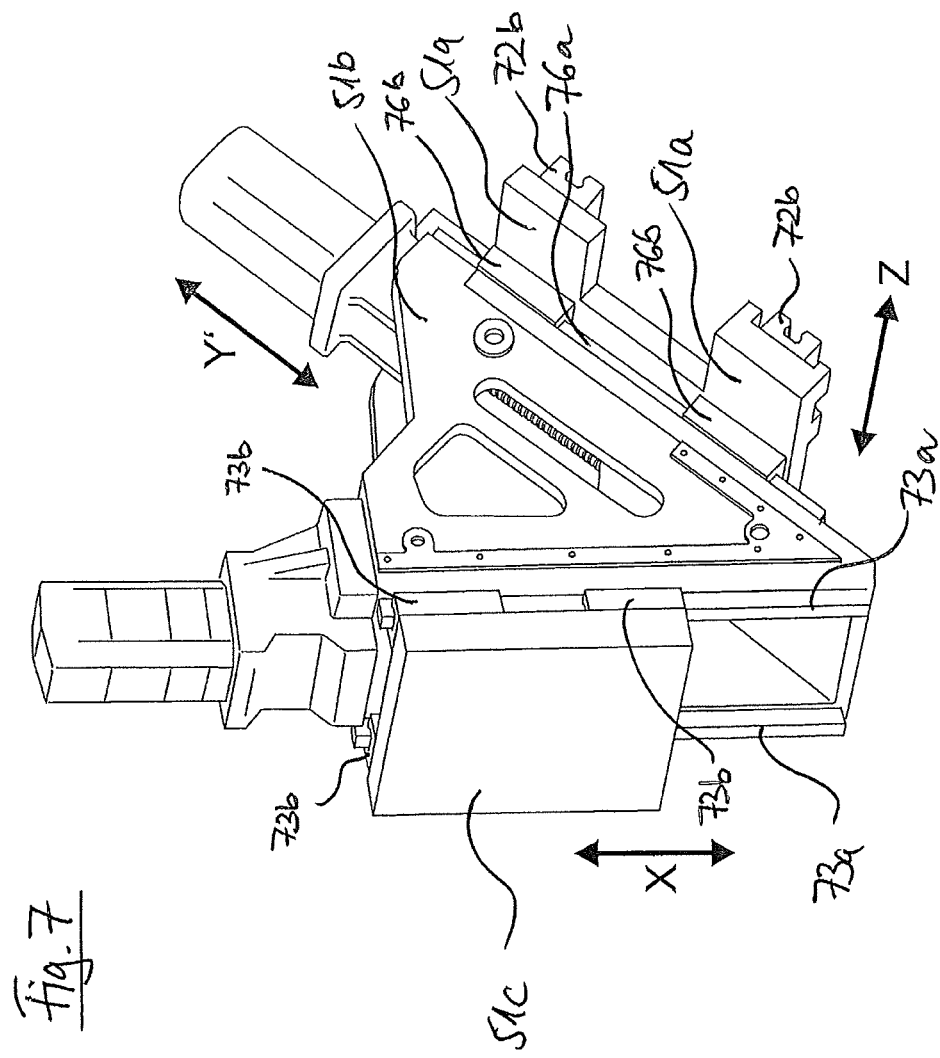

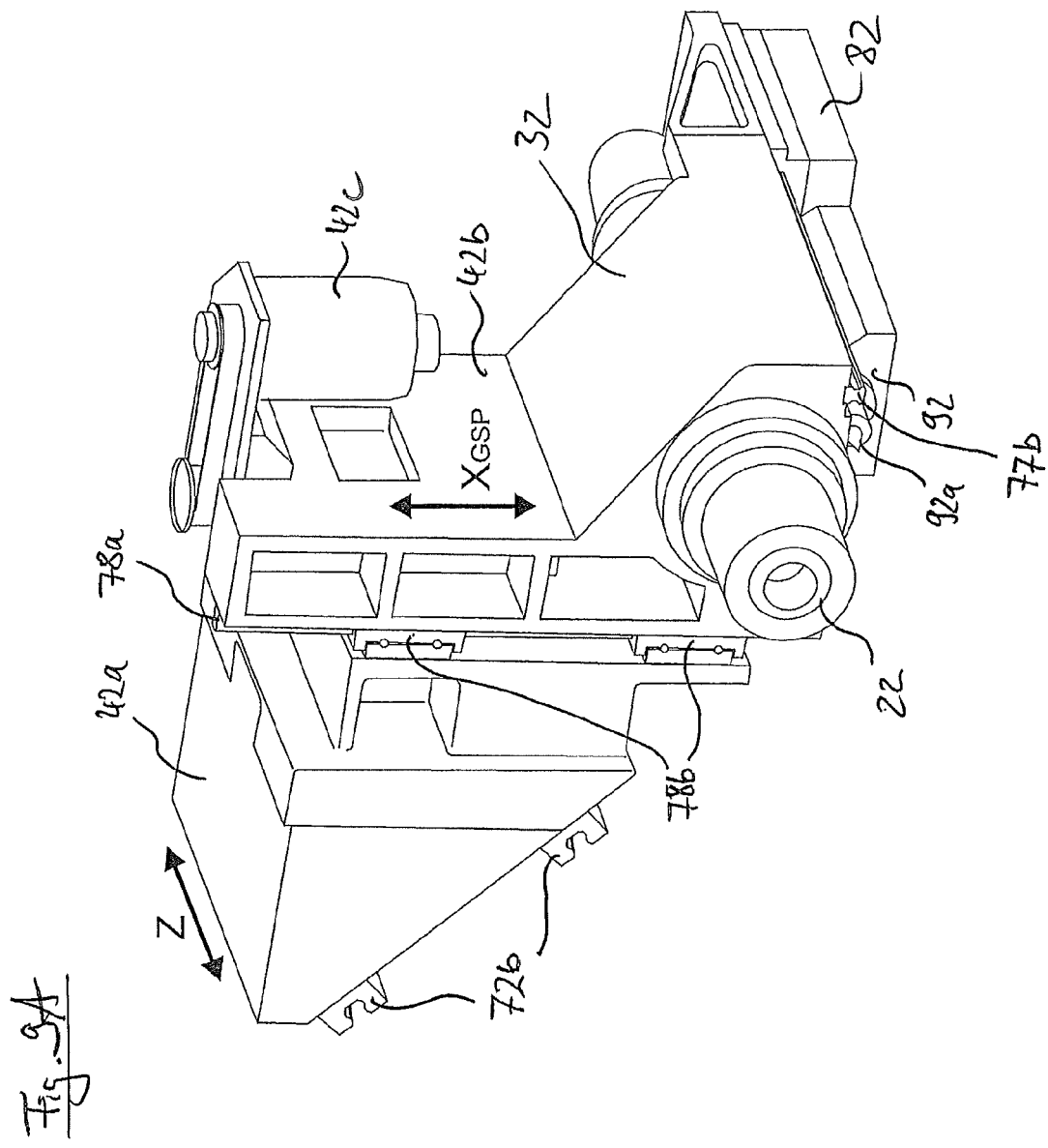

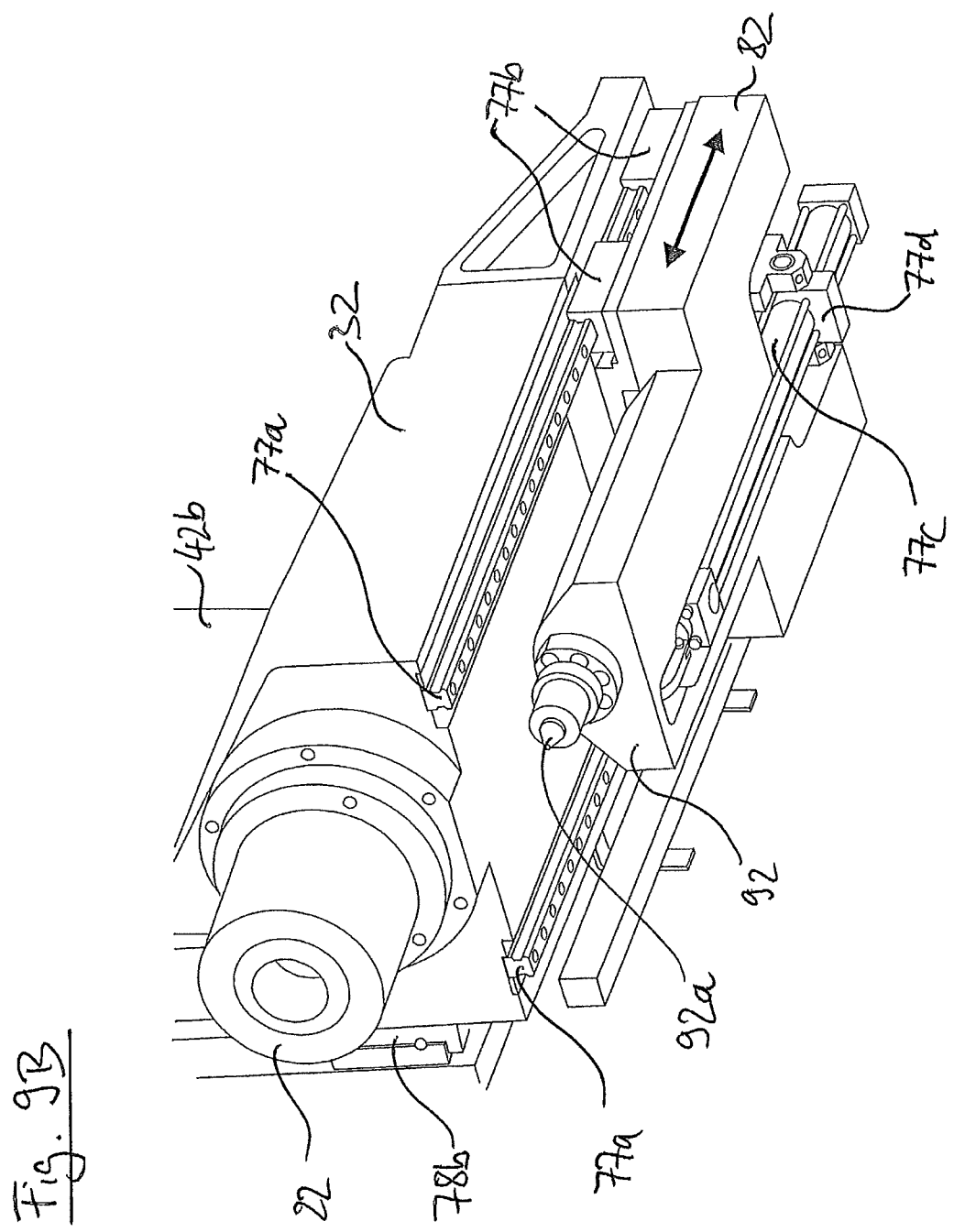

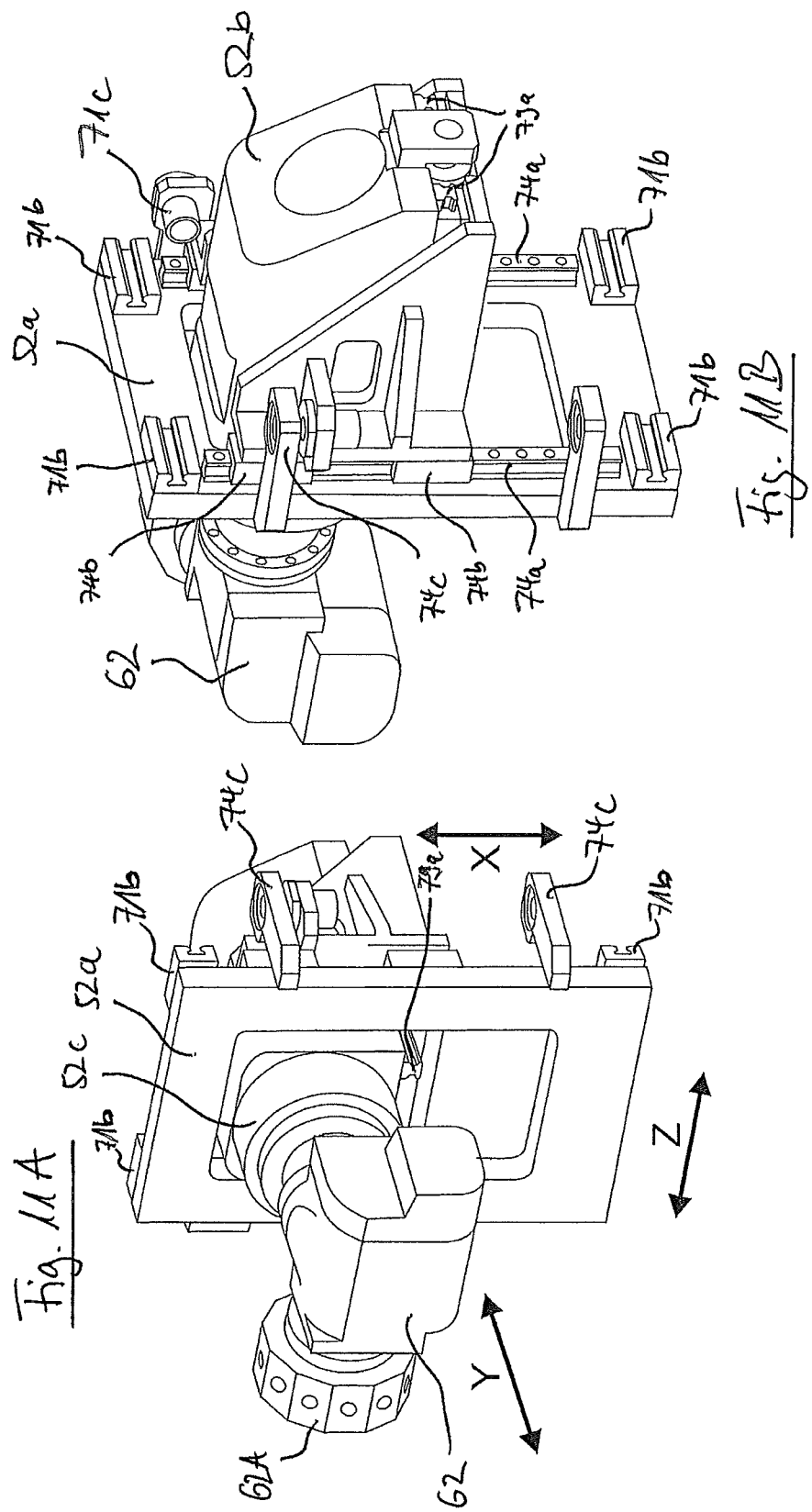

ly mounted work spindles which face each other and have parallel or
MACHINE TOOL

CROSS-REFERENCE TO RELATED APPLICATIONS

This application is the U.S. National Stage entry under 35 U.S.C. §371 of international application PCT/EP2012/059292, filed 18 May 2012, which in turn claims priority to German patent applications DE 10 2011 076 834.3, filed 31 May 2011; DE 10 2011 076 835.1, filed 31 May 2011; and DE 10 2011 077 571.4, filed 15 Jun. 2011.

The present invention relates to a machine tool, in particular a lathe, comprising a machine frame, a first spindle carrier which is arranged at the machine frame and which holds a first work spindle to receive a first workpiece, a first tool carrier slide which is arranged at the machine frame and on which a first tool carrier for tools is arranged to machine the first workpiece at the first work spindle, a second spindle carrier which is arranged at the machine frame and which holds a second work spindle facing the first work spindle to receive a second workpiece, wherein the spindle axis of the second work spindle is aligned in parallel, in particular coaxially, to the spindle axis of the first work spindle, and a second tool carrier slide which is arranged at the machine frame and on which a second tool carrier for tools is arranged to machine the second workpiece at the second work spindle.

BACKGROUND OF THE INVENTION

Machine tools of the generic type comprise a machine frame that is provided with at least two rotatably mounted work spindles which face each other and have parallel or coaxial spindle axes, wherein the work spindles can receive workpieces which are machined on the machine tool. In order to provide the tools for machining, tool carriers are supplied which are usually made available on movable tool carrier slides, in particular compound slides, which are arranged at the machine frame and can be moved by means of one or more linear axes relative to the work spindles (e.g. can be moved in the X, Y or Z direction). Machine tools of this generic type are known from DD 279 429 A1 or also EP 0 999 002 A1, for example.

In general, machine tools of this generic type require that the machine tool be provided so as to enable efficient machining of the workpieces with the largest possible number of tools usable at the same time, if possible, with the highest possible degree of flexibility as regards the control of the relative movements between the tools and the tools received in the work spindles, accompanied by a simultaneous compact and cost-effective but rigid design of the machine tool, and with a machining area which can be accessed in the best possible way by the processor or operator of the machine tool.

Therefore, it is the object of the invention to improve a machine tool of the generic type so as to enable more efficient machining of the workpieces with the largest possible number of tools usable at the same time, if possible, with the highest possible degree of flexibility as regards the control of the relative movements between the tools and the tools received in the work spindles, accompanied by a simultaneous compact and cost-effective yet rigid design of the machine tool, and with a machining area which can be accessed in the best possible way by the processor or operator of the machine tool.

SUMMARY OF THE INVENTION

In order to achieve the above mentioned object, the present invention proposes a machine tool according to independent claim 1. Dependent claims relate to preferred embodiments of the machine tool according to the present invention.

The concept on which the invention is based is here in particular to provide a double spindle machine tool having work spindles facing one another along with one or more tool carrier slide units arranged next to the spindles with a middle tool carrier which is arranged between the spindle carriers, is movable in a direction parallel to the spindle axes and has a rotational axis transversely to the spindle axes, said tool carrier being provided with a flexible usable tool turret, wherein the tool carrier arranged between the spindle carriers can be rotated by means of the rotatably controllable rotational axis so as to align the tool turret with the two spindles. As a result, workpieces received at the main spindle and also workpieces received at the opposed counter spindle can be machined by tools held by the middle tool carrier in a particularly flexible way.

Thus, the middle tool carrier having a rotational axis can advantageously be employed, accompanied by an extremely advantageous compact design and a very good accessibility to the machining area, to provide an already very large number of flexibly usable tools on the machine tool so as to obtain a very high degree of flexibility with respect to the control of the relative movements between the tools and the tools received in the work spindles.

In addition, it is particularly useful to provide the middle tool carrier according to the invention with a rotational axis at double spindle lathes between the spindle carriers which hold two parallel or coaxially arranged work spindles facing each other so as to enable, as a result of the rotation of the tool carrier by means of the rotational axis, constellations where workpieces can be machined both axially and radially and where workpieces at the two work spindles can simultaneously be machined with opposite tools at the tool turret of the tool carrier. Hence it is advantageously possible by means of the tool carrier arranged between the spindle carriers to already provide a plurality of different machining possibilities with a plurality of different tools using only a single tool carrier and with a design that is extremely compact.

The present invention proposes a machine tool, in particular a lathe, which comprises a machine frame having a first carrier side and a second carrier side, wherein the machine frame includes a first carrier portion, a second carrier portion and a middle carrier portion arranged between the first and second carrier portions.

According to the invention there is provided a first spindle carrier which is arranged on the first carrier side of the first carrier portion and which holds a first work spindle to receive a first workpiece, wherein furthermore a first tool carrier slide arranged on the second carrier side of the first carrier portion is provided, on which a first tool carrier for tools is arranged to machine the first workpiece.

The machine tool according to the invention also comprises a first spindle carrier slide arranged on the first or second carrier side of the second carrier portion, said spindle carrier slide accommodating a second spindle carrier which holds a second work spindle facing the first work spindle to receive a second workpiece, wherein the spindle axis of the second work spindle is aligned parallel, in particular coaxially, to the spindle axis of the first work spindle and wherein the second spindle carrier can be moved in a direction parallel to the spindle axes.

In order to machine the workpieces there is also provided a second tool carrier slide arranged on the first carrier side of the middle portion, said tool carrier slide accommodating a second tool carrier for tools to machine the first or second workpiece. According to the invention, the second tool carrier slide is arranged on the first carrier side between the first spindle carrier and the second spindle carrier, and the second tool carrier can be moved in a first direction parallel to the spindle axes of the first and second work spindles.

Furthermore, the second tool carrier slide comprises a rotational axis by means of which the second tool carrier can be controlled so as to rotate about an axis of rotation aligned transversely to the spindle axes, and the second tool carrier comprises a tool turret which has a tool-carrying tool turret head which is mounted so as to rotate about a turret axis aligned transversely to the axis of rotation.

In summary, the present invention makes it possible to provide a machine tool, in particular a lathe, so as to enable more efficient machining of the workpieces with the largest possible number of tools usable at the same time, if possible, accompanied by the highest possible degree of flexibility in respect of the control of the relative movements between the tools and the tools received in the work spindles, while the design of the machine tool is simultaneously compact and cost-effective but rigid, and with an operating area which can be accessed very well by the processor or operator of the machine tool.

The tool turret is preferably arranged on the second tool carrier so as to be offset relative to the axis of rotation of the rotational axis. Thus, the tool turret is preferably arranged on the second tool carrier so as to be eccentric in relation to the axis of rotation or the second tool carrier is preferably made as an eccentric. As a result, it is advantageously possible to further improve the handling of the tool carrier which is arranged between the spindle carriers and has a tool turret since, when the tool carrier is rotated about the rotational axis, the turret is hence not only turned but also pivoted. Therefore, it is advantageously possible to place the tool carrier between the spindle carriers so as to pivot the tool turret into the area between the spindle axes to axially machine workpieces or simultaneously machine workpieces at both spindles.

In addition, the tool turret can also be pivoted out of the area between the spindle axes on account of the high degree of control flexibility to radially machine workpieces. Therefore, the control flexibility can be greatly improved with respect to feeding the tools to the spindles. Alternatively, it is also possible to provide embodiments in which the tool turret is arranged on the second tool carrier so as to lie substantially in the axis of rotation of the rotational axis.

The turret axis of the tool turret head, which is preferably aligned transversely, in particular perpendicularly, to the axis of rotation of the rotational axis can be rotated or swiveled by rotating the second tool carrier about the rotational axis relative to the spindle axes. By rotating the second tool carrier about the rotational axis, the turret axis of the tool turret head can here preferably be aligned transversely, in particular perpendicularly, to the spindle axes, can preferably be aligned parallel to the spindle axes, and/or can preferably be aligned at any angle relative to the spindle axes.

Accompanied by extremely flexible control possibilities or feed possibilities, this enables the advantageous radial and axial machining of workpieces at the spindles by means of the tool carrier arranged between the spindle carriers. For example, if tool units aligned radially relative to the turret are used, a workpiece can be machined radially (relative to the spindle axes) when the turret axis is aligned essentially parallel to the spindle axes, and the workpiece can be machined axially when the turret axis is aligned essentially transversely to the spindle axes. However, if tool units aligned axially relative to the turret are used, a workpiece can be machined axially when the turret axis is aligned essentially in parallel to the spindle axes, and the workpiece can be machined radially when the turret axis is aligned essentially transversely to the spindle axis.

It is here most useful to provide the plurality of tool supports of the tool turret with radial and also axial tool units. For this purpose, the tool turret head preferably has a plurality of supports for receiving tools or tool-holding tool holders, wherein the supports are in particular adapted to receive radial tool holders and/or radial tool holder units which hold tools radially relative to the turret axis and to receive axial tool holders and/or axial tool holder units which hold tools axially relative to the turret axis. This enables a large number of machining possibilities and/or machining constellations of the workpieces as well as a simple and flexible design.

The second tool carrier is preferably adapted to align a support of the tool turret head by rotating the tool turret head about the turret axis to a workpiece received at one of the work spindles, wherein the supports are preferably arranged in pairs relative to the turret axis on the tool turret head on opposite sides thereof so as to preferably align one support each with the second work spindle by aligning another opposite support with the first work spindle when the turret axis is aligned transversely, in particular perpendicularly, to the spindle axes. This can advantageously be provided by pivoting the tool turret between the spindles and aligning the turret axis transversely to the spindle axes.

Considering such a constellation, it is advantageously possible to position the tool turret so as to align a tool support or a tool holder held at the support or a tool held at the support with the first work spindle to machine a workpiece held at the first spindle while a tool support arranged on the tool turret on the opposite side relative to the turret axis and/or a tool holder held at the support or a tool held at the support can be aligned with the second work spindle to machine a workpiece held at the second spindle. This enables in a particularly useful fashion the simultaneous machining of both workpieces held at the spindles by the same tool carrier or tool turret.

The second tool carrier slide is preferably made as a compound slide and the second tool carrier is preferably also movable in a second direction transversely, in particular perpendicularly, to the spindle axes of the first and second work spindles. It is thus possible to enable a further essential improvement of the flexibility with respect to the control of the relative movements between the tools and the tools received in the work spindles.

The second tool carrier slide preferably comprises additionally a linear axis, by means of which the second tool carrier can also be moved in a third direction transversely, in particular perpendicularly, to the spindle axes of the first and second work spindles and transversely, in particular perpendicularly, to the second direction. Thus, a further essential improvement of the flexibility can be enabled with respect to the control of the relative movements between the tools and the tools received in the work spindles.

The linear axis of the second tool carrier slide preferably comprises a retractable and expandable shaft or quill (hollow shaft) which is supported at the second tool carrier slide, at one end of which the second tool carrier is preferably attached. This enables the provision of the tool carrier arranged between the work spindles and the tool carrier slide thereof in an advantageously compact fashion. What is meant here by a linear axis having a retractable and expandable shaft or quill (hollow shaft) is that no simple double compound slide is provided which has three tool carrier slides that are movable relative to one another and that are arranged on top of one another but that a shaft or quill aligned in the third direction is mounted so as to be movable in a hollow member (or quill carrier portion) of a compound slide to provide the third linear axis of the tool carrier slide.

Such a shaft or quill (hollow shaft) can also be advantageously mounted so as to be rotatable about the rotational axis of the tool carrier arranged between the spindle carriers. Thus, the design of the linear axis of the third direction can be combined in a particularly simple and compact way with the rotatably controllable rotational axis of the tool carrier. It is here preferred to provide a torque motor which rotatably drives the shaft or quill (hollow shaft) movable in the third direction to form the rotational axis of the tool carrier.

The machine tool preferably comprises a second spindle carrier slide which is movable in the direction of the spindle axes, which is arranged on the first carrier side of the first carrier portion and on which the first spindle carrier of the first work spindle is held. It is thus possible to enable a further essential improvement of the flexibility with respect to the control of the relative movements between the tools and the tools received in the work spindles.

A tailstock slide movable in a direction parallel to the spindle axes is preferably arranged at the first or second spindle carrier which carries a tailstock having a tailstock tip. This makes it advantageously possible to further improve the flexibility of using the machine tool since an advantageously arranged tailstock can additionally be provided. Here, the movability of the tailstock slide at the first or second spindle carrier in the direction of the spindle axes is particularly useful since the tailstock and/or the tailstock tip thereof and/or the centering tip can be moved towards the opposite spindle into the machining area when it is to be used, and the tailstock can be moved away from the opposite spindle out of the machining area, should it not be required.

According to a particularly useful exemplary embodiment of the machine tool according to the invention, the first spindle carrier slide is arranged on the first carrier side, wherein guideways preferably aligned in parallel to the spindle axes are arranged on the first carrier side of the middle carrier portion and of the second carrier portion where preferably both the second tool carrier slide and the first spindle carrier slide are guided so as to be movable in a direction parallel to the spindle axes. In this exemplary embodiment, a particularly compact and simple design can be provided since the first spindle carrier slide and the second tool carrier slide can be guided on the same guideways, in particular on the same guide rails. The guideways here extend preferably consistently on the first carrier side on the middle carrier portion and the second carrier portion.

In an embodiment in which the other one of the two spindles is also arranged on a spindle carrier slide so as to be movable in the direction of the spindle axes, the guideways preferably extend consistently on the first carrier side on the first carrier portion, the middle carrier portion and the second carrier portion, wherein preferably the two spindle carrier slides and the second tool carrier slide are guided on the same guideways on the first carrier side.

The machine tool in this exemplary embodiment preferably comprises a third tool carrier slide arranged on the second carrier side of the second carrier portion, which accommodates a third tool carrier for tools to machine the second workpiece. It is thus possible to provide an even greater number of workpieces for the machining operation and to enable a further essential improvement of the flexibility with respect to the control of the relative movements between the tools and the tools received in the work spindles.

The first tool carrier slide and/or the third tool carrier slide are preferably movable in a direction parallel to the spindle axes. Here, guideways aligned preferably in a direction parallel to the spindle axes are arranged on the second carrier side and preferably extend from the first carrier portion via the middle carrier portion to the second carrier portion. Said guideways preferably guide both the first tool carrier slide and the third tool carrier slide so as to be movable in a direction parallel to the spindle axes. In this exemplary embodiment, a particularly compact and simple design can be provided since the first tool carrier slide and the third tool carrier slide can be guided on the same guideways, in particular on the same guide rails. The guideways here preferably extend consistently on the second carrier side over the first carrier portion, the middle carrier portion and the second carrier portion.

According to an alternative exemplary embodiment of the machine tool according to the invention, which is also particularly useful, the first spindle carrier slide is arranged on the second carrier side, wherein guideways which are preferably aligned in a direction parallel to the spindle axes are arranged on the second carrier side, said guideways preferably extending from the first carrier portion via the middle carrier portion to the second carrier portion, where both the first tool carrier slide and the first spindle carrier slide are preferably guided so as to be movable in a direction parallel to the spindle axes. In this exemplary embodiment, it is also possible to provide a particularly compact and simple design since the first spindle carrier slide and the first tool carrier slide can be guided on the same guideways, in particular on the same guide rails. The guideways here preferably extend consistently on the second carrier side over the first carrier portion, the middle carrier portion and the second carrier portion.

The first spindle carrier slide is preferably made as a compound slide and preferably comprises a first spindle carrier partial slide which is movable in a direction parallel to the spindle axes and a second spindle carrier partial slide which is preferably arranged on the first spindle carrier partial slide so as to be movable in a direction transversely, in particular perpendicularly, to the spindle axes. It is thus possible to enable a further essential improvement of the flexibility with respect to the control of the relative movements between the tools and the tools received in the work spindles.

In this exemplary embodiment where the first spindle carrier slide is made as a compound slide, a tailstock slide movable in a direction parallel to the spindle axes is preferably provided, is arranged at the first spindle carrier and carries a tailstock having a tailstock tip. In this case, the moving direction of the spindle carrier slide of the second work spindle transversely to the spindle axes is preferably aligned in parallel to a perpendicular which intersects the spindle axes and the tailstock axis perpendicularly in such a way that, by moving the first spindle carrier slide in a direction transversely to the spindle axes, the spindle axes can be aligned coaxially with one another and the spindle axis of the first work spindle can be aligned coaxially with the tailstock axis of the tailstock.

This enables a simple and compact design and, by moving the first spindle carrier slide transversely to the spindle axes, an alignment of the tailstock axis for a tailstock use coaxially relative to the first work spindle or the alignment of the second work spindle coaxially relative to the first work spindle. Thus, the possible uses of the machine tool can be further improved essentially while the design remains simple and compact.

The first tool carrier slide and/or a third tool carrier slide arranged on the second carrier side are preferably made as a double compound slide, wherein a first partial slide is preferably arranged so as to be movable in a direction parallel to the spindle axes, a second partial slide is arranged so as to be movable in a direction transversely, in particular perpendicularly, to the spindle axes and/or a third partial slide is arranged so as to be movable in a direction transversely, in particular perpendicularly, to the spindle axes and transversely, optionally also perpendicularly, to the moving direction of the second partial slide. It is thus possible to enable a further essential improvement of the flexibility with respect to the control of the relative movements between the tools and the tools received in the work spindles.

The first carrier side preferably clamps a first plane and the second carrier side preferably clamps a second plane, wherein the first plane is preferably aligned parallel or perpendicularly relative to the second plane. In an alternative and particularly useful fashion, the first plane can also be aligned so as to be inclined with respect to the second plane. When the angle between the first plane and the second plane is inclined, a machine frame can be provided which can be extremely compact and simultaneously extremely rigid.

In the case of designs having a spindle carrier slide arranged on the second carrier side, a first side of the first spindle carrier partial slide, which faces the second carrier side, preferably clamps a third plane which is preferably aligned parallel to the second plane, and a second side of the first spindle carrier partial slide, which faces the second spindle carrier partial slide, preferably clamps a fourth plane which is aligned parallel to the first plane, wherein the first spindle carrier partial slide can be made in particular as a wedge-type slide in such a way that the second spindle carrier partial slide is arranged on the first spindle carrier partial slide so as to be movable in particular parallel to the first plane.

The advantage is that, while the design is simple and compact, the second spindle carrier partial slide can be moved on the first spindle carrier partial slide independently of the alignment of the first plane relative to the second plane (i.e. parallel, inclined or perpendicular) in a direction parallel to the fourth and/or parallel to the first plane of the first carrier side.

A first side of the second partial slide of the first and/or third tool carrier slide, which faces the first partial slide on the second carrier side, preferably clamps a fifth plane which is preferably aligned parallel to the second plane, and a second side of the second partial slide, which preferably faces the third partial slide, preferably clamps a sixth plane which is preferably aligned parallel to the first plane, wherein the second partial slide can be made in particular as a wedge-type slide in such a way that the third partial slide is arranged on the second partial slide so as to be movable in particular parallel to the first plane.

The advantage is that, while the design is simple and compact, the third tool carrier partial slide can be moved on the second tool carrier partial slide independently of the alignment of the first to the second plane (i.e. parallel, inclined or perpendicular) in a direction parallel to the sixth and/or parallel to the first plane of the first carrier side. When the angle between the first and second carrier sides and/or between the first plane and the second plane is inclined, the second partial slide is here preferably made as a wedge-type slide which has a wedge-type shape including an inclined angle which compensates the inclined angle between the first and second carrier sides and/or between the first plane and the second plane in such a way that the third partial slide can be moved parallel to the first carrier side and/or to the first plane in spite of the angle and/or can be moved perpendicularly to the second carrier side and/or to the second plane, and therefore the tool carrier can be advanced to the spindles in an optimum and flexible fashion.

The axis of rotation of the rotational axis is preferably aligned transversely, preferably essentially perpendicularly, relative to the first plane.

BRIEF DESCRIPTION OF THE FIGURES

FIG. 3 shows by way of example a further schematic diagram of a top view of the machine tool according to the first exemplary embodiment of the present invention from FIG. 2.

FIGS. 5A to 5D show by way of example further schematic diagrams of a detailed view of the tool carrier of the machine tool according to the first exemplary embodiment of the present invention from FIG. 2, said tool carrier being arranged between the spindle carriers.

FIG. 6A shows by way of example a schematic diagram of a perspective front view of the tool carrier of the machine tool according to the first exemplary embodiment of the present invention from FIG. 2, said tool carrier being arranged between the spindle carriers, and FIG. 6B shows by way of example a schematic diagram of a perspective rear view of the tool carrier of the machine tool according to the first exemplary embodiment of the present invention from FIG. 2, said tool carrier being arranged between the spindle carriers.

FIG. 7 shows by way of example a schematic diagram of a perspective front view of a tool carrier of the machine tool according to the first exemplary embodiment of the present invention from FIG. 2, said tool carrier being arranged on the second carrier side.

FIG. 9A shows by way of example a schematic diagram of a perspective front view of the spindle carrier slide of the machine tool according to the second exemplary embodiment of the present invention from FIG. 8, and FIG. 9B shows by way of example a schematic diagram of a perspective detailed view of the spindle carrier slide of the machine tool according to the second exemplary embodiment of the present invention from FIG. 8.

FIG. 11A shows by way of example a schematic diagram of a perspective front view of an alternative embodiment of the tool carrier of the machine tool, said tool carrier being arranged between the spindle carriers, and FIG. 11B shows by way of example a schematic diagram of a perspective rear view of the alternative embodiment of the tool carrier of the machine tool from FIG. 11A, said tool carrier being arranged between the spindle carriers.

FIG. 11F shows by way of example a schematic diagram of a sectional view of the alternative embodiment of the tool carrier of the machine tool from FIG. 11A, said tool carrier being arranged between the spindle carriers.

DETAILED DESCRIPTION OF PREFERRED EXEMPLARY EMBODIMENTS OF THE PRESENT INVENTION

Preferred exemplary embodiments of the present invention are described in detail below with reference to the enclosed figures. However, the present invention is not limited to the described exemplary embodiments. The present invention is defined by the scope of the claims. Equal or similar features of the exemplary embodiments are marked in the figures by the same reference signs.

Figure 1:
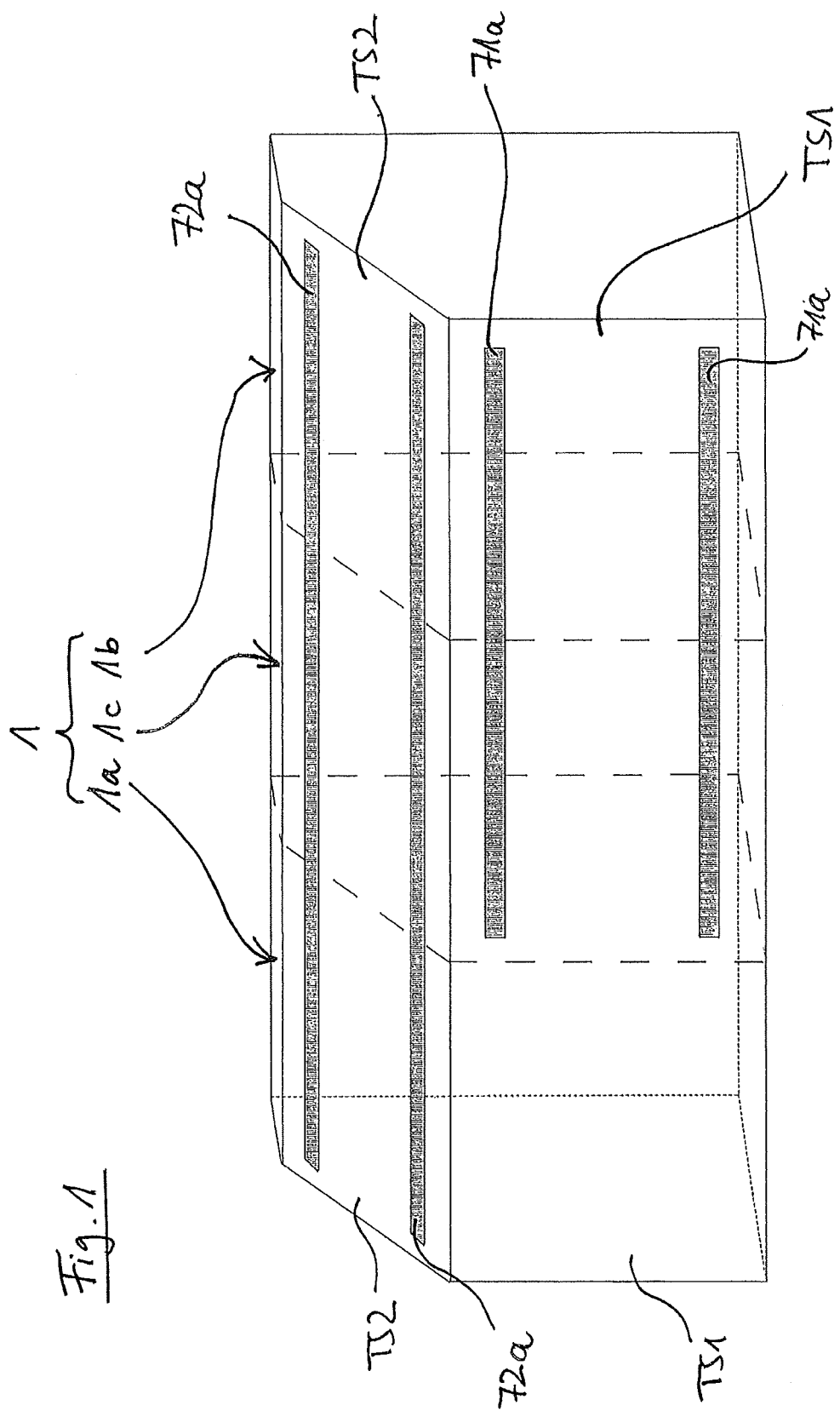
FIG. 1 shows by way of example a schematic diagram of a perspective view of the machine frame design of a machine tool according to a preferred embodiment of the present invention.

FIG. 1 shows by way of example a schematic diagram of a perspective view of the machine frame design of a machine frame 1 of a machine tool according to a preferred embodiment of the present invention.

In this example, the machine frame 1 has a first carrier side TS1 which is arranged by way of example on the front side of the machine frame 1 and a second carrier side TS2 which is arranged by way of example on the top side of the machine frame 1. In other embodiments, the machine frame can also be aligned differently, e.g. in such a way that the first carrier side TS1 is arranged on the top side of the machine frame and the second carrier side TS2 is arranged on the front or rear side.

The machine frame 1 has a first carrier portion 1a, a second carrier portion 1b and a middle carrier portion 1c which is arranged between the first and second carrier portions. The transitions between the carrier portions are shown in FIG. 1 by way of example by dashed lines. In this exemplary embodiment according to FIG. 1, the carrier portions 1a to 1c are connected to one another but can also be provided in separate fashion in other exemplary embodiments of the invention.

On the carrier sides, guideways 71a, in particular guide rails, are arranged schematically in FIG. 1 in parallel on the first carrier side TS1, and guideways 72a, in particular guide rails, are arranged in parallel on the second carrier side TS2. Here, the guideways 71a and 72a are adapted to guide tool carrier slides and/or spindle carrier slides so as to be movable in the direction of the guideways.

The guideways 71a on the first carrier side TS1 of the machine frame 1 extend here by way of example on the first carrier side TS1 consistently over the middle carrier portion 1c and the second carrier portion 1b. The guideways 72a on the second carrier side TS2 of the machine frame 1 extend by way of example on the second carrier side TS2 consistently over the first carrier portion 1a, the middle carrier portion 1c and the second carrier portion 1b.

The first carrier side TS1 clamps a first plane and the second carrier side TS2 clamps a second plane, wherein the first plane is aligned so as to be inclined relative to the second plane. This enables a simultaneously compact and rigid design of the machine frame. As a result of the inclination of the first carrier side TS1 relative to the second carrier side TS2, a necessary floor space of the machine frame can be reduced in FIG. 1, for example, without reducing the area of the second carrier side TS2, said area being necessary and available for guideways 72a. In other exemplary embodiments, the first plane and the second plane can also be aligned in parallel or perpendicularly to one another.

Here, it is not necessarily required for the base body of the machine frame to have accurately planar sides which clamp said planes. The above mentioned planes can rather be comprehended more abstractly to be the geometric planes which essentially correspond to the sides of the machine frame or are essentially clamped by the respective sides of the machine frame or to be geometric planes where the moving planes of the slides are disposed which are formed or clamped by the guideways 71a and 72a for slides, for example. They can also be referred to as guideway planes.

First Exemplary Embodiment

Figure 2:
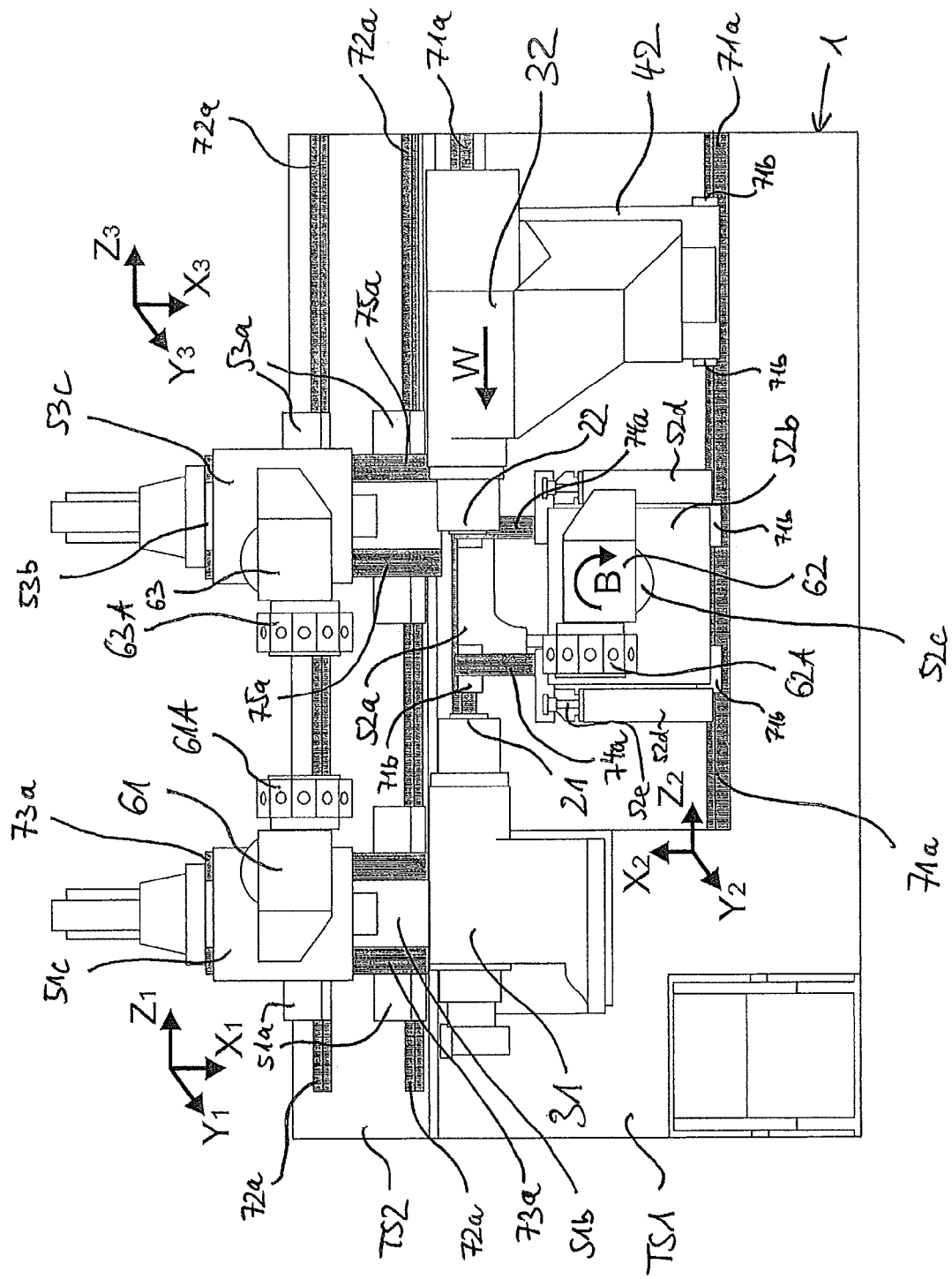
FIG. 2 shows by way of example a schematic diagram of a front view of a machine tool according to a first exemplary embodiment of the present invention.
Figure 2:
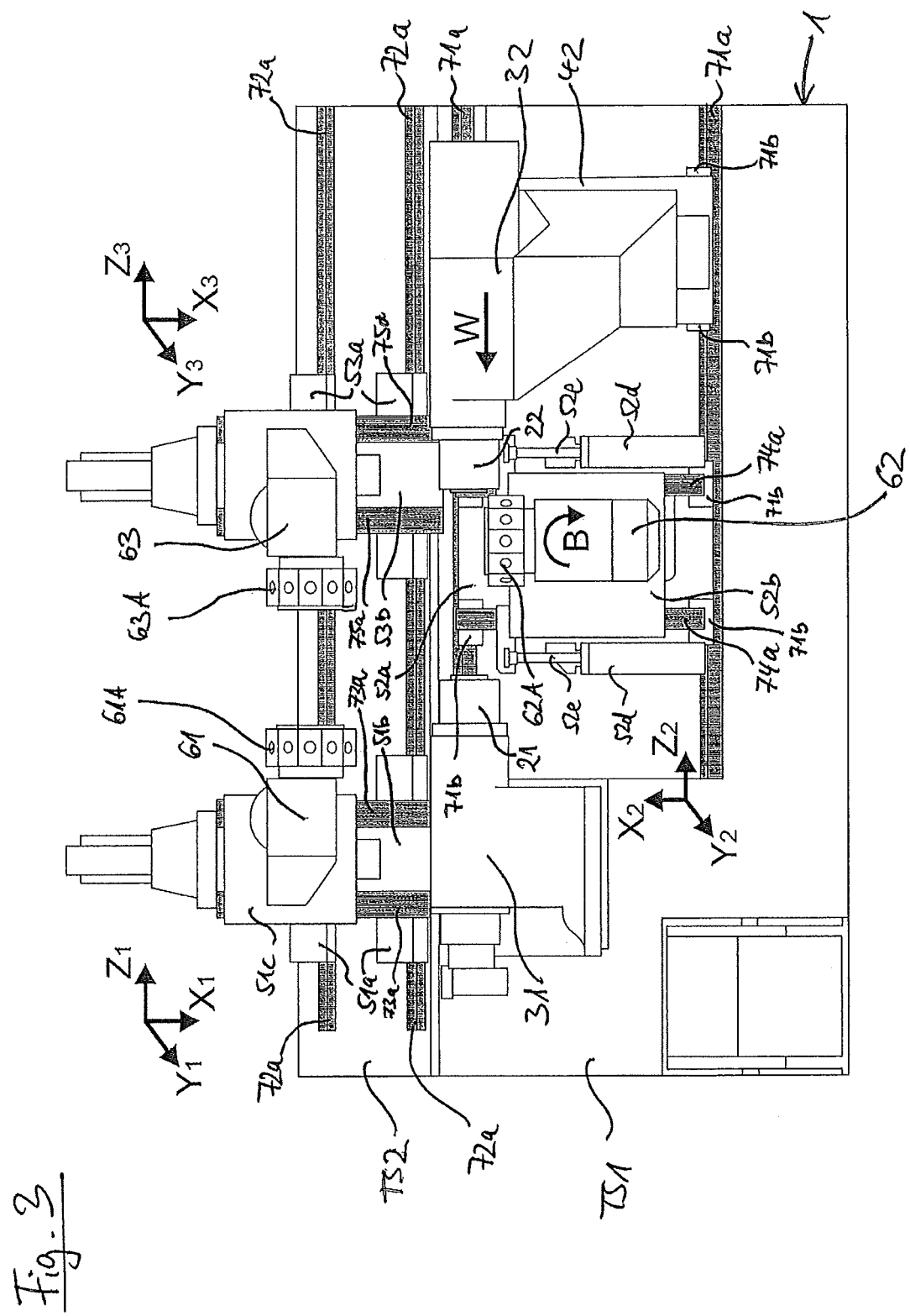

FIG. 2 shows by way of example a schematic diagram of a front view of a machine tool according to a first exemplary embodiment of the present invention. The machine frame 1 here corresponds to the machine frame design according to FIG. 1, i.e. the first carrier side TS1 and the second carrier side TS2 are aligned in inclined fashion relative to one another.

The machine tool according to FIG. 2 comprises a first spindle carrier 31 which is arranged on the first carrier side TS1 of the first carrier portion 1a and which holds a first work spindle 21 to receive a first workpiece W1, and a first tool carrier slide which is arranged on the second carrier side TS2 of the first carrier portion 1a and which includes partial slides 51a, 51b and 51c, wherein a first tool carrier 61 for tools is arranged on the first tool carrier slide (in particular on the partial slide 51c) to machine the first workpiece W1 at the first work spindle 21. In this exemplary embodiment, the first tool carrier 61 is made as a radial tool turret having a tool turret head 61A, the turret axis of which is aligned by way of example in parallel with the spindle axis of the first work spindle 21.

Furthermore, the tool machine comprises a first spindle carrier slide 42 which is arranged on the first carrier side TS1 of the second carrier portion 1b and on which a second spindle carrier 32 is arranged that holds a second work spindle 22 facing the first work spindle 21 to receive a second workpiece W2. The spindle axis of the second work spindle 22 is aligned e.g. coaxially relative to the spindle axis of the first work spindle 21. The second spindle carrier 32 is movable in direction W parallel to the spindle axes and is held for this purpose on the first spindle carrier slide 42 which is guided on the guide rails 71a. As in FIG. 1, the guideways 71a extend parallel to one another and parallel to the spindle axes consistently over the middle carrier portion 1c and the second carrier portion 1b.

In this exemplary embodiment, the spindle carrier 31 is fixed to the machine frame 1 and the first work spindle 21 is not movable. However, it is also possible to provide exemplary embodiments in which the first work spindle 21 can be moved in a direction parallel to the spindle axes, e.g. in that the guides 71a also extend to the first carrier portion 1a and the spindle carrier 31 is guided in analogy to the spindle carrier 32 on a spindle carrier slide on the guideways 71a. In support of an extremely compact design, it is then advantageously possible to guide the two spindle carrier slides and the tool carrier slide 52 arranged between the spindle carriers on the same guides 71a.

Furthermore, the machine tool comprises a second tool carrier slide 52 which is arranged on the first carrier side TS1 of the middle portion 1c, comprising partial slides 52a and 52b as well as a portion 52c (e.g. a quill carrier portion) where a second tool carrier 62 for tools is arranged to machine the first workpiece W1 on the first work spindle 21 or a second workpiece W2 on the second work spindle. The second tool carrier slide 52 is arranged on the first carrier side TS1 of the machine frame 1 between the first spindle carrier 31 and the second spindle carrier 32.

The second tool carrier 62 can be moved in a first direction Z2 parallel to the spindle axes of the first and second work spindles 21, 22. To this end, the partial slide 52a is guided on the guideways 71a on the first carrier side TS1 and can be moved in the first direction Z2 parallel to the spindle axes of the first and second work spindles 21, 22.

In this exemplary embodiment, the first spindle carrier slide 42 is thus arranged on the first carrier side TS1 by way of example, wherein the guide rails 71a which are aligned in parallel to the spindle axes are arranged on the first carrier side TS1 of the middle carrier portion 1c and of the second carrier portion 1b, on which thus both the second tool carrier slide 52, in particular partial slide 52a, and the first spindle carrier slide 42 are guided so as to be movable in a direction Z2, W parallel to the spindle axes. For this purpose, guide members 71b for the guide rails 71a are provided on both the partial slide 52a and the first spindle carrier slide 42.

The second tool carrier slide 52 is made as a compound slide and comprises the partial slide 52a which can be moved on the guideways 71a in a direction parallel to the spindle axes, and the partial slide 52b which is arranged on the partial slide 52a and which is guided by the guideways 74a which are arranged on the partial slide 52a and are aligned in a second direction X2 perpendicular to the spindle axes. Therefore, the partial slide 52b and thus the second tool carrier 62 is also movable in the second direction X2 perpendicular to the spindle axes of the first and second work spindles 21, 22. For this purpose, a hydraulic system is provided for driving the linear axis for the second direction X2, said hydraulic system comprising two hydraulic cylinders 52d which are arranged relative to the direction of the spindle axes on opposed sides of the partial slide 52a and extend in the second direction X2. Furthermore, respective hydraulic pistons 52e are provided in the hydraulic cylinders 52d, which extend on one side beyond the cylinders 52d and can be retracted or extended at the cylinders 52d by hydraulic forces. FIG. 2 shows a retracted state of the hydraulic pistons 52e which are connected to the partial slide 52b at ends opposite to the cylinders 52d.

The second tool carrier slide 52 additionally comprises a further linear axis, by means of which the second tool carrier 62 is movable in a third direction Y2 perpendicular to the spindle axes of the first and second work spindles 21, 22 and perpendicular to the second direction X2. Exemplary embodiments of this linear axis are described below.

The second tool carrier slide 52 additionally comprises a rotational axis B, by means of which the second tool carrier 62 can be controlled so as to rotate about an axis of rotation aligned transversely to the spindle axes. The second tool carrier 62 comprises a tool turret which has a tool-carrying tool turret head 62A that is rotatably mounted about a turret axis aligned transversely to the axis of rotation. The tool turret 62A is here arranged on the tool carrier 62 so as to be displaced laterally and relative to the axis of rotation of the rotational axis B. In this embodiment, the tool turret 62A is thus arranged on the tool carrier 62 so as to be advantageously eccentric relative to the axis of rotation of the rotational axis B, and the tool carrier 62 is made as an eccentric. FIG. 3 shows by way of example a further schematic diagram of a top view of the machine tool according to the first exemplary embodiment of the present invention from FIG. 2. Here, the second tool carrier 62 and thus also the tool turret 62A is rotated relative to the orientation in FIG. 2 by 90° by means of the rotational axis B. In FIG. 2, the turret axis of the tool turret 62A is aligned parallel to the spindle axes, and in FIG. 3, the turret axis of the tool turret 62A is aligned perpendicularly to the spindle axes. Other than in FIG. 2, FIG. 3 shows the hydraulic pistons 52e in an extended state.

The machine tool according to FIG. 2 or FIG. 3 also comprises a third tool carrier slide 53 which is arranged on the second carrier side TS2 of the second carrier portion 1b and includes partial slides 53a, 53b and 53c, wherein a third tool carrier 63 for tools is arranged on the third tool carrier slide 53 (in particular on the partial slide 53c) to machine the second workpiece W2 at the second work spindle 21. In this exemplary embodiment, the third tool carrier 63 is made as a radial tool turret having a tool turret head 63A, the turret axis of which is aligned by way of example in parallel with the spindle axis of the second work spindle 22.

The first tool carrier slide 51 and the third tool carrier slide 53 are guided in the direction Z1, Z3 on the guideways 72a on the second carrier side TS2 and can be moved in parallel to the spindle axes. For this purpose, the guideways 72a aligned in the direction Z1, Z3 in parallel to the spindle axes are arranged on the second carrier side TS2 and extend by way of example consistently from the first carrier portion 1a over the middle carrier portion 1c to the second carrier portion 1b.

By way of example, the first tool carrier slide 51 and the third tool carrier slide 53 are made as double compound slides where in each case three partial slides 51a to 51c or 53a to 53c which are arranged on top of one another and are movable relative to one another are provided. The partial slides 51c and/or 53c are here guided by guideways 73a and/or 75a. In this embodiment, the first tool carrier 61 can be moved in direction Z1 in parallel to the spindle axes and in two directions X1 and Y1, wherein the directions X1 and Y1 are aligned transversely to one another and also transversely to the spindle axes.

In this embodiment, the third tool carrier 63 is movable in the direction Z3 parallel to the spindle axes and in two directions X3 and Y3, wherein the directions X3 and Y3 are aligned transversely to one another and also transversely to the spindle axes. The middle partial slides 51b and/or 53b are made as wedge-type slides and thus the directions Z1 and X1 as well as the directions Z3 and X3 are essentially aligned perpendicularly to one another. With respect to a more detailed description of such a double compound slide having a middle wedge-type slide, reference is made to FIG. 7 and the associated description.

FIGS. 4A to 4D show by way of example schematic diagrams of a detailed view of the tool carrier 62 of the machine tool according to the first exemplary embodiment of the present invention from FIG. 2, said tool carrier being arranged between the spindle carriers. In all diagrams, the tool carrier 62 is aligned so as to machine a workpiece W1 accommodated by the first work spindle 21. By rotating the rotational axis B, the tool carrier 62 is always aligned in such a way that the angle of the turret axis of the tool turret 62A to the spindle axes is 0° in FIG. 4A, approximately 45° in FIGS.

Figure 4B:
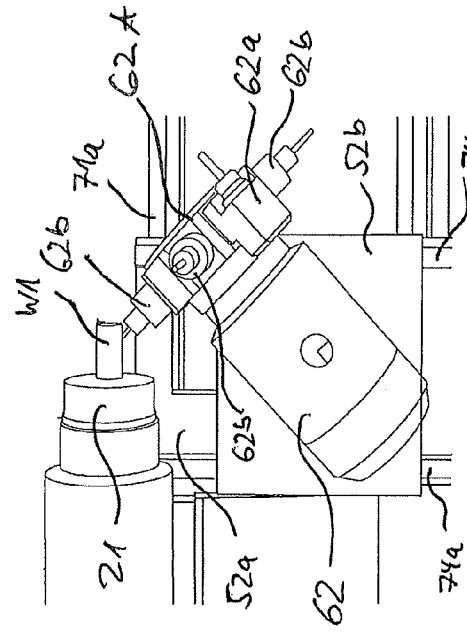
FIGS. 4A to 4D show by way of example schematic diagrams of a detailed view of the tool carrier of the machine tool according to the first exemplary embodiment of the present invention from FIG. 2, said tool carrier being arranged between the spindle carriers.
Figure 4D:
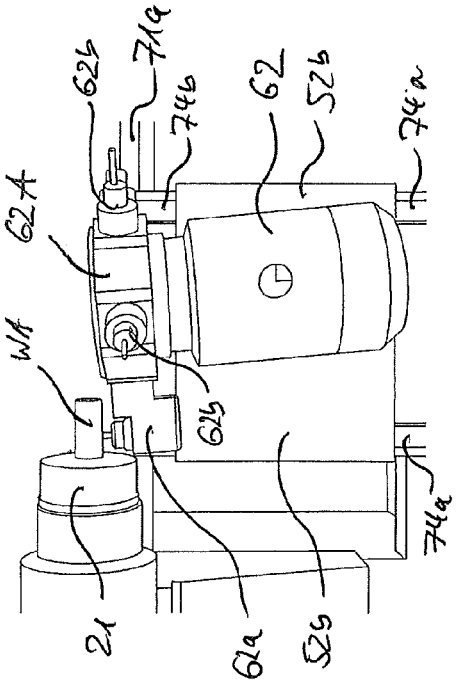

4B and 4C and approximately 90° in FIG. 4D. Therefore, the turret axis of the tool turret head 62A can be aligned by rotating the second tool carrier 62 about the rotational axis B transversely to the spindle axes, can be aligned parallel to the spindle axes and be aligned at any angle relative to the spindle axes.

As already shown in FIGS. 2 and 3 and specified in FIGS. 4A to 4D, the tool turret of the tool carrier 62 is made as a radial turret. In its periphery, the tool turret head 62A comprises a plurality of supports 62d at its periphery to receive tools 62c and/or tool-holding tool holders 62a and 62b, wherein the supports are in particular adapted to receive radial tool holders 62b which hold tools radially relative to the turret axis and to receive axial tool holder units 62a which hold tools axially relative to the turret axis. As shown in FIGS. 4A to 4D, the second tool carrier 62 is adapted to align a support 62d and/or tools 62c received at a tool support and/or tool holders 62a, 62b of the tool turret head 62A by rotation of the tool turret head 62A about the turret axis to a workpiece received at one of the work spindles, in FIGS. 4A to 4D by way of example by means of the workpiece W1 received at the first work spindle 21.

The supports 62d are arranged in pairs each relative to the turret axis on opposed sides on the tool turret head 62A in such a way that one support each can be aligned with the second work spindle 22 by aligning another, opposite support with the first work spindle 21 when the turret axis is aligned transversely, in particular perpendicularly, to the spindle axes. This can be best understood in FIG. 4D (or in analogy in FIG. 5D). In a turret axis which as in FIG. 4D is aligned transversely and essentially perpendicularly to the spindle axes, a tool holder (e.g. the right-hand tool holder 62b) arranged on the right-hand side of the tool turret 62A can be aligned to a workpiece at the second work spindle 22 in addition to the tool holder 62a on the left-hand side which is aligned to the workpiece W1 at the first work spindle 21.

Figure 4A:
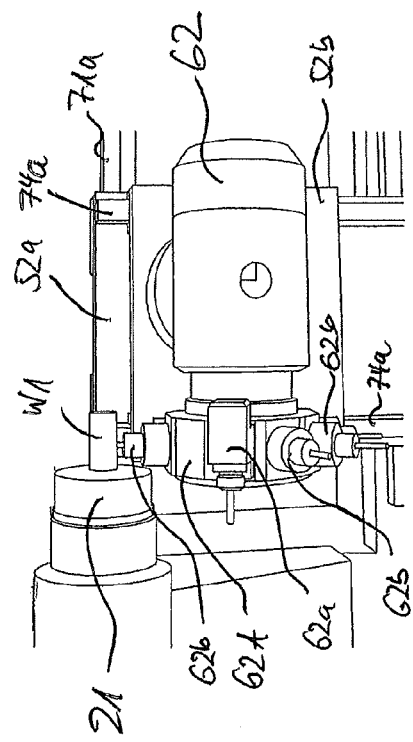
Figure 4C:
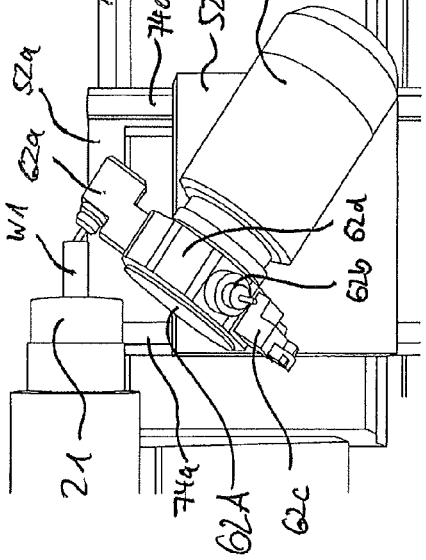

Furthermore, FIG. 4A shows how the workpiece W1 at the first work spindle 21 can be radially machined (radial relative to the spindle axis) by means of a radial tool holder 62b (radial relative to the turret axis) when the turret axis of the tool turret 62A is aligned essentially in parallel to the spindle axes. However, FIG. 4D shows how the workpiece W1 at the first work spindle 21 can be radially machined (radial relative to the spindle axis) by means of an axial tool holder 52a (axial relative to the turret axis) when the turret axis of the tool turret 62A is aligned transversely to the spindle axes.

In analogy, the workpiece W1 at the first work spindle 21 can be axially machined (axial relative to the spindle axis) by means of a radial tool holder 62b (radial relative to the turret axis) when the turret axis of the tool turret 62A is aligned transversely to the spindle axes, and the workpiece W1 at the first work spindle 21 can be axially machined (axial relative to the spindle axis) by means of an axial tool holder 62a (axial relative to the turret axis) when the turret axis of the tool turret 62A is aligned essentially in parallel to the spindle axes.

FIGS. 5A to 5D show by way of example further schematic diagrams of a detailed view of the tool carrier 62 of the machine tool according to the first embodiment of the present invention from FIG. 2, said tool carrier being arranged between the spindle carriers. In all diagrams, the tool carrier 62 is aligned so as to machine a workpiece W2 received at the first work spindle 22. By rotating the rotational axis B, the tool carrier 62 is respectively aligned in such a way that the angle of the turret axis of the tool turret 62A to the spindle axes is 0° in FIG. 5A, approximately 45° in FIGS. 5B and 5C and approximately 90° in FIG. 5D. The turret axis of the tool turret head 62A can thus be aligned by rotating the second tool carrier 62 about the rotational axis B transversely to the spindle axes, can be aligned in parallel to the spindle axes and can be aligned at any angle relative to the spindle axes.

FIG. 6A shows by way of example a schematic diagram of a perspective front view of the tool carrier slide 52 of the machine tool according to the first embodiment of the present invention from FIG. 2, said tool carrier slide being arranged between the spindle carriers 31 and 32, and FIG. 6B shows by way of example a schematic diagram of a perspective rear view of the tool carrier slide 52 of the machine tool according to the first embodiment of the present invention from FIG. 2, said tool carrier slide being arranged between the spindle carriers 31 and 32.

Figure 6C:
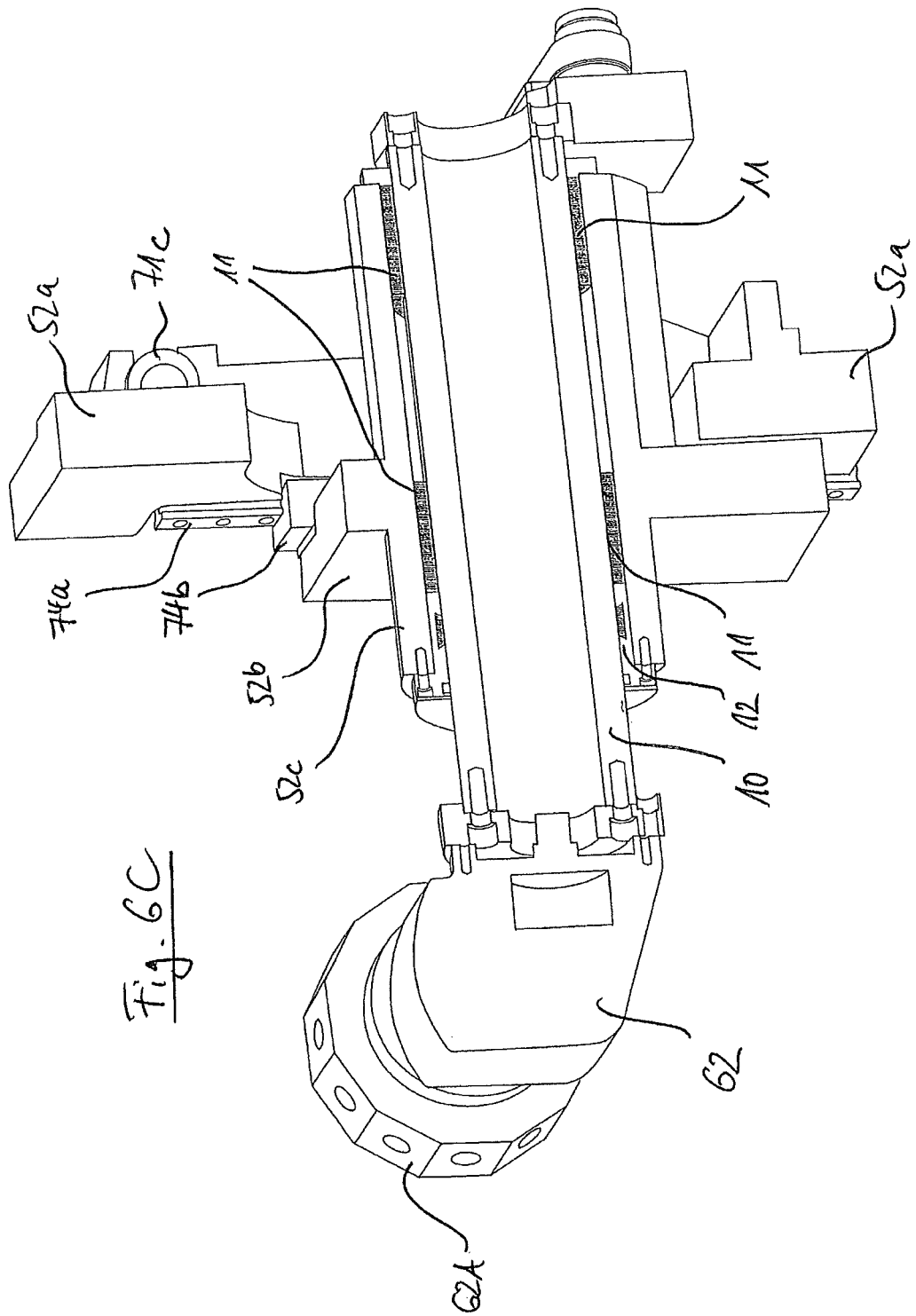
FIG. 6C shows by way of example a schematic diagram of a perspective sectional view of the tool carrier of the machine tool according to the first exemplary embodiment of the present invention from FIG. 2, said tool carrier being arranged between the spindle carriers.

The tool turret head 62A is arranged at the tool carrier body 62 which is connected to the partial slide 52b via a portion 52c (quill carrier portion; see FIG. 6C). The partial slide 52b is guided by means of four guide members 74b attached to the corners of the partial slide 52b on the guide rails 74a in the X-direction, wherein the guide rails 74a are attached to the partial slide 52a.

The movement of the partial slide 52b relative to the partial slide 52 can be controlled by means of the hydraulic system comprising the hydraulic cylinders 52d and the hydraulic pistons 52e. The hydraulic cylinders 52d are laterally attached to the partial slide 52a and the ends of the hydraulic pistons 52e, which are opposed to the hydraulic cylinders 52d, are laterally connected to the partial slide 52b.

Guide members 71b are, in turn, attached to the four corners of the partial slide 52a and they serve for guiding the partial slide 52a on the guide rails 71a in the Z-direction parallel to the spindle axes. Reference signs 52f and 52g denote drives for the axes. A sliding bearing 71c is also optionally provided for the Z-axis guidance and a sliding bearing 74c is also provided for the X-axis guidance and accommodates a guide shaft 74d which is movable in the X-direction therein.

Figure 6D:
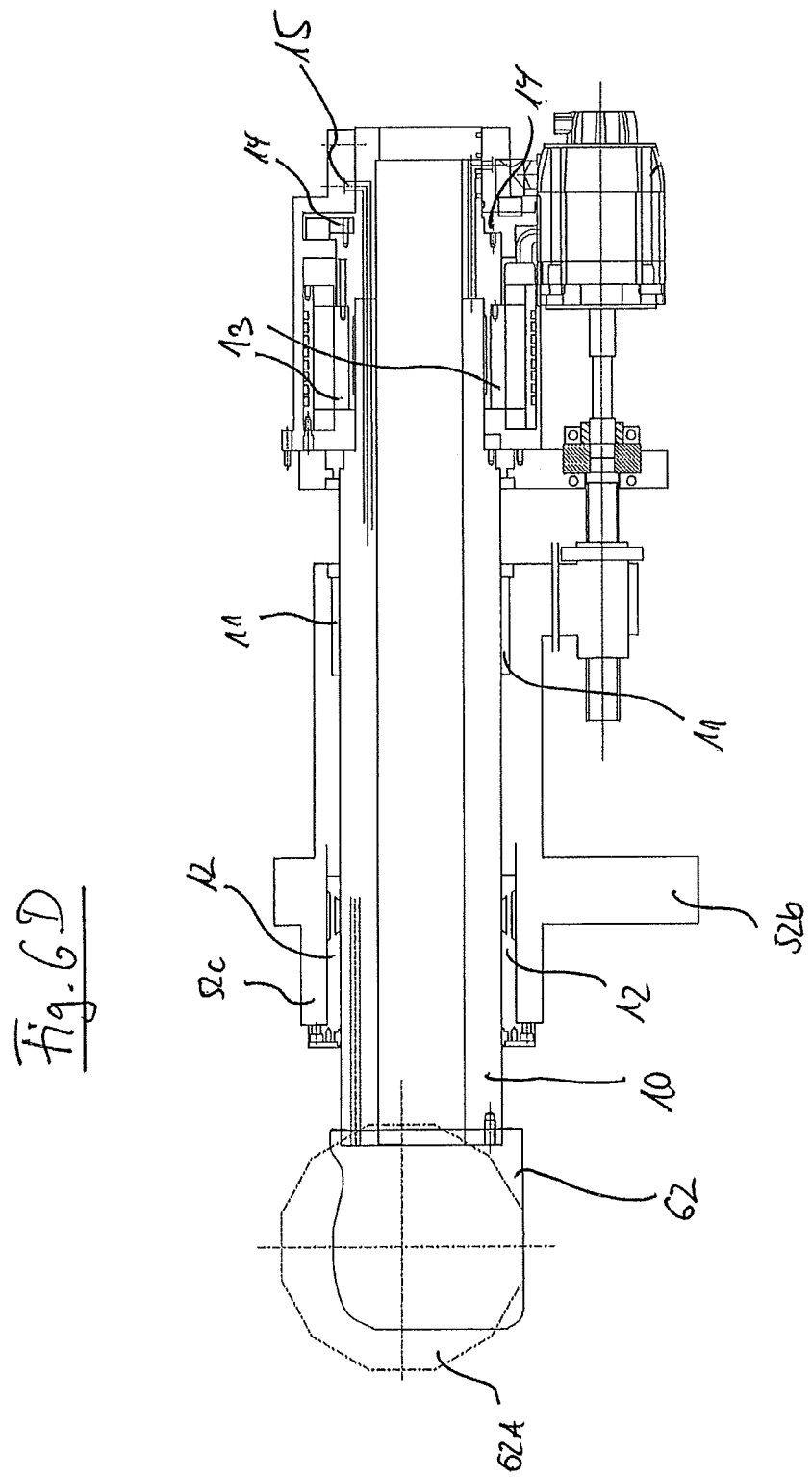
FIG. 6D shows by way of example a schematic diagram of a sectional view of the tool carrier of the machine tool according to the first exemplary embodiment of the present invention from FIG. 2, said tool carrier being arranged between the spindle carriers.

FIG. 6C shows by way of example a schematic diagram of a perspective sectional view of the tool carrier 62 of the machine tool according to the first embodiment of the present invention from FIG. 2, said tool carrier being arranged between the spindle carriers 31 and 32, and FIG. 6D shows by way of example a schematic diagram of a sectional view of the tool carrier 62 of the machine tool according to the first exemplary embodiment of the present invention from FIG. 2, said tool carrier being arranged between the spindle carriers 31 and 32.

The tool carrier body 62 at which the tool turret head 62A is attached, is mounted on a quill 10 (hollow shaft which, however, can also be made as a solid shaft in further exemplary embodiments) which is movable in a hollow body of the quill carrier portion 52c of the partial slide 52b in the Y-direction and is rotatably mounted about the rotational axis B. Therefore, the Y-axis of the tool carrier slide 52 is made as an axis having a retractable and extendable quill 10, wherein the quill 10 can be retracted into the hollow body of the quill carrier portion 52c and extended out of the hollow body of the quill carrier portion 52c "like a telescope".

This design is advantageously more compact than a double compound slide design in which a further partial slide is arranged on the compound slide design made of the partial slides 52a and 52b. In order to support the quill 10 in the hollow body of the quill carrier portion 52 of the partial slide 52b, bearing bushes 11 are provided in the hollow body. In addition, a hydraulic brake 12 is provided so as to be able to fix the quill 10 in the hollow body, if required. A torque motor 13 is provided for driving the rotational axis B and rotatably drives the quill 10 about the axis of rotation of the rotational axis B. A hydraulic system is provided for the drive of the linear axis and comprises a hydraulic connection 15. The position of the rotational axis B can be monitored via an incremental encoder 14.

FIG. 7 shows by way of example a schematic diagram of a perspective front view of the tool carrier 51 of the machine tool according to the first exemplary embodiment of the present invention from FIG. 2, said tool carrier being arranged on the second carrier side TS2. In FIGS. 2 and 3, the tool carrier 53 has the same design as the tool carrier 51.

By way of example, the first tool carrier slide 51 is made as a double compound slide. The first tool carrier slide 51 here comprises the partial slide 51a which is arranged so as to be movable in the direction Z1 parallel to the spindle axes, i.e. in FIG. 7 in the Z-direction, and is guided by the guideways 72a. For this purpose, guide members 72b are provided at the partial slide 51a. Furthermore, the first tool carrier slide 51 comprises a partial slide 51b which is arranged on the partial slide 51a and which is designed as a wedge-type slide (the angle between the side of the wedge-type slide 51b that faces the partial slide 51a and the side of the wedge-type slide 51b that faces the partial slide 51c forms an acute angle of less than 90°). Guide members 76b are mounted on the top side of the partial slide 51a for guide rails 76a which are mounted on the bottom side of the partial slide 51b and by means of which the partial slide 51b can be moved in the Y'-direction, wherein the Y'-direction is aligned perpendicularly to the direction Z aligned parallel to the spindle axes.

Guide rails 73a are mounted on the front side of the partial slide 51b and extend in the X-direction, wherein on account of the wedge-type shape of the wedge-type slide 51b the X-direction is aligned perpendicularly to the Z-direction and transversely, but not perpendicularly, to the Y'-direction. Here, the bottom side and the front side of the middle wedge-type slide 51b form an acute angle to compensate the inclined (non-rectangular) angle between the first carrier side TS1 and the second carrier side TS2 in such a way that the front side of the partial slide 51b is aligned parallel to the first carrier side TS1 and that the partial slide 51c can be moved parallel to the first carrier side. In particular, a first side (bottom side) of the second partial slide 51b, which faces the first partial slide 51a on the second carrier side TS2, clamps a fifth plane which is aligned in parallel to the second plane of the second carrier side TS2, and a second side (front side) of the second partial slide 51b, which faces the third partial slide 51c, clamps a sixth plane which is aligned in parallel to the first plane of the first carrier side TS1. In this design comprising a wedge-type slide, the partial slide 51c can advantageously be moved in particular parallel to the X2-direction of the second tool carrier 52.

In alternative embodiments in which the first and second carrier sides TS1 and TS2 are aligned perpendicularly to one another, the angle between the first and second sides of the partial slide 51b is preferably essentially 90°, and in embodiments in which the first and second carrier sides TS1 and TS2 are aligned in parallel to each other, the first side and the second side of the partial slide 51b are preferably aligned in parallel. Thus, it can be ensured in such alternative embodiments as well that the partial slide 51c can be moved advantageously in parallel to the X2-direction of the second tool carrier 52.

Second Exemplary Embodiment

Figure 8:
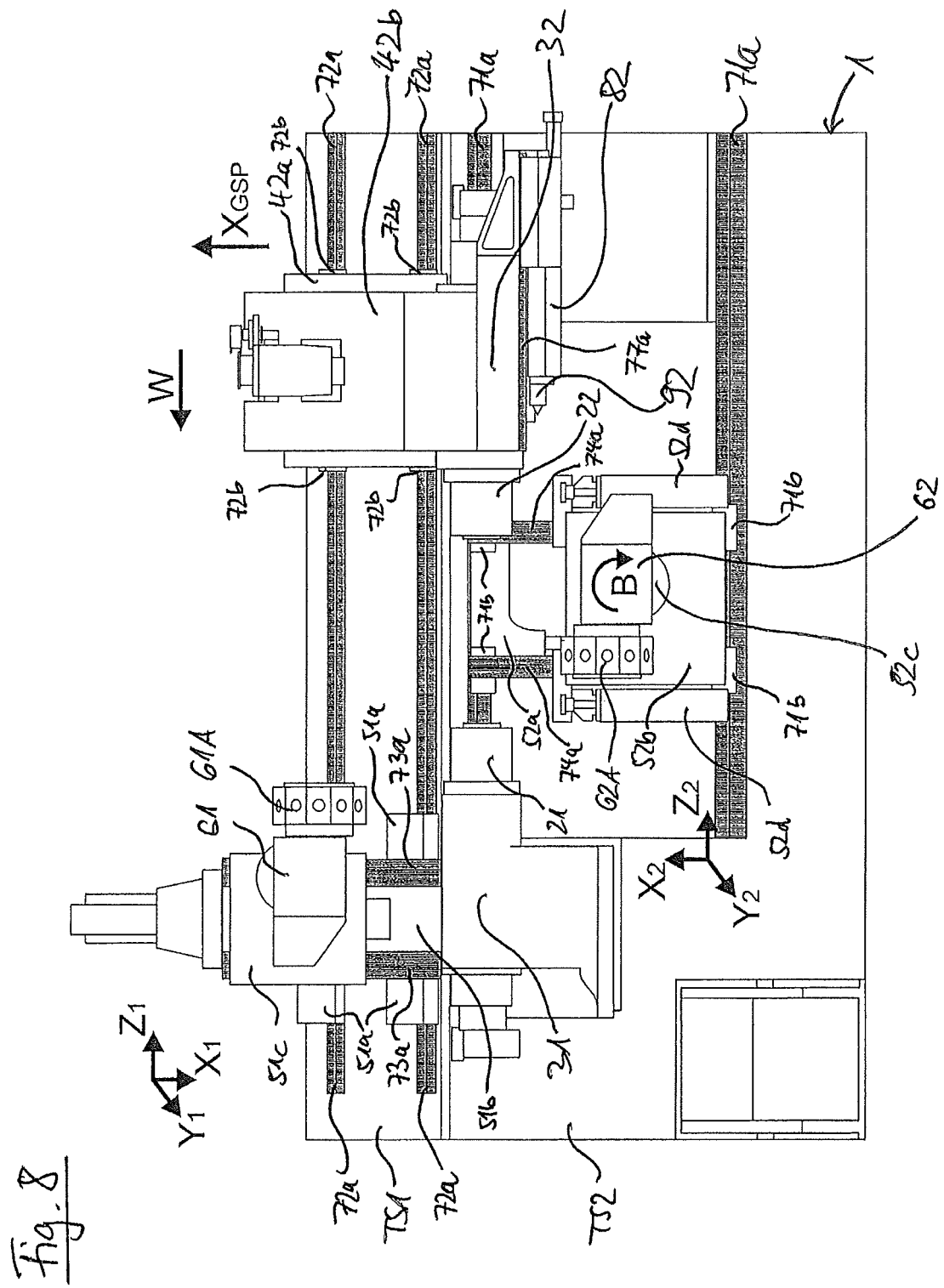
FIG. 8 shows by way of example a schematic diagram of a front view of a machine tool according to a second exemplary embodiment of the present invention.

FIG. 8 shows by way of example a schematic diagram of a front view of a machine tool according to a second exemplary embodiment of the present invention. The arrangement and the design of the machine frame 1, of the first tool carrier slide 51 including the first tool carrier 61 and of the second tool carrier slide 52 including the second tool carrier 62 are equal compared to the first exemplary embodiment.

However, no third tool carrier slide 53 is arranged on the second carrier side TS2 but the spindle carrier slide 42 is arranged on the second carrier side TS2 and the second work spindle 22 is held by the spindle carrier 32 so as to extend towards the first carrier side TS1. The first and second work spindles 21 and 22 are again coaxially aligned in FIG. 8, however, the second work spindle 22 is movable in addition to direction W aligned parallel to the spindle axes in a direction XGSP transversely, in particular perpendicularly, to the spindle axes. For this purpose, the spindle carrier slide 42 is made as a compound slide including partial slides 42a and 42b. Here, the partial slide 42a is guided on the guide rails 72a on the second carrier side TS2 on which the first tool carrier slide 51, in particular partial slide 51a, is guided so as to be movable in direction Z1 parallel to the spindle axes.

FIG. 9A shows by way of example a schematic diagram of a perspective front view of the spindle carrier slide 42 of the machine tool according to the second exemplary embodiment of the present invention from FIG. 8, and FIG. 9B shows by way of example a schematic diagram of a perspective detailed view of the spindle carrier slide 42 of the machine tool according to the second exemplary embodiment of the present invention from FIG. 8.

The first spindle carrier slide 42 is made as a compound slide and comprises the first spindle carrier partial slide 42a movable in direction W parallel to the spindle axes and the second spindle carrier partial slide 42b which is arranged on the first spindle carrier partial slide 42a so as to be movable in direction XGSP transversely, in particular perpendicularly, to the spindle axes. An axis drive 42C is provided with respect to the movability in direction XGSP. On the bottom side of the first spindle carrier partial slide 42a, guide members 72b for the guide rails 72a are mounted on the second spindle carrier side TS2. On the front side of the spindle carrier partial slide 42a, guide members 78b for the guide rails 78a are mounted which are mounted on the rear side of the second spindle carrier partial slide 42b and are aligned in the XGSP direction.

Here, the bottom side and the front side of the first spindle carrier partial slide 42a form an angle to compensate the angle between the first carrier side TS1 and the second carrier side TS2 in such a way that the front side of the first spindle carrier partial slide 42a is aligned parallel to the first carrier side TS1 and the second spindle carrier partial slide 42b is movable parallel to the first carrier side TS1. In particular a first side (bottom side) of the first spindle carrier partial slide 42a, which faces the second carrier side TS2, clamps a third plane which is aligned parallel to the second plane of the second carrier side TS2 and a second side (front side) of the first spindle carrier partial slide 42a, which faces the second spindle carrier partial slide 42b, clamps a fourth plane which is aligned parallel to the first plane of the first carrier side TS1. Here, the spindle carrier partial slide 42a is made as a wedge-type slide so as to be similar to the wedge-type slide 51b shown in FIG. 7. In this design comprising a wedge-type slide, the partial slide 42b can in particular be moved so as to be advantageously parallel to the X2 direction of the second tool carrier 52.

In alternative embodiments in which the first and second carrier sides TS1 and TS2 are aligned perpendicularly to each other, the angle between the first and second sides of the first spindle carrier partial slide 42a is preferably essentially 90°, and in embodiments in which the first and second carrier sides TS1 and TS2 are aligned in parallel to each other, the first side and the second side of the first spindle carrier partial slide 42a are preferably aligned in parallel.

Guide rails 77a are mounted on the bottom side of the second spindle carrier partial slide 42b, which is aligned in particular perpendicularly to the first carrier side TS1, and are aligned in a direction parallel to the spindle axes. A tailstock slide 82 is guided on these guide rails 77a, and guide members 77b for the guide rails 77a are mounted thereon. A drive system having a bearing 77d and a guide shaft 77c is arranged on the bottom side of the tailstock slide 82. The tailstock slide 82 carries a tailstock 92 having a centering tip 92a.

The design is here provided in such a way that the direction XGSP is aligned in parallel to give a perpendicular which intersects the spindle axes and the tailstock axis perpendicularly in such a way that by moving the first spindle carrier slide 42, in particular the second spindle carrier partial slide 42b, in the direction XGSP transversely to the spindle axes, the spindle axes can be aligned coaxially with respect to one another (as shown in FIG. 8) and also the spindle axis of the first work spindle 21 can be aligned coaxially with the tailstock axis of the tailstock 92. When the tailstock axis is aligned coaxially with the spindle axis of the first work spindle 21, the tailstock 92 can be retracted into the machining area for a tailstock use underneath the second work spindle 22 in a direction parallel to the spindle axes or in a direction approaching the first work spindle 21.

Third Exemplary Embodiment

Figure 10:
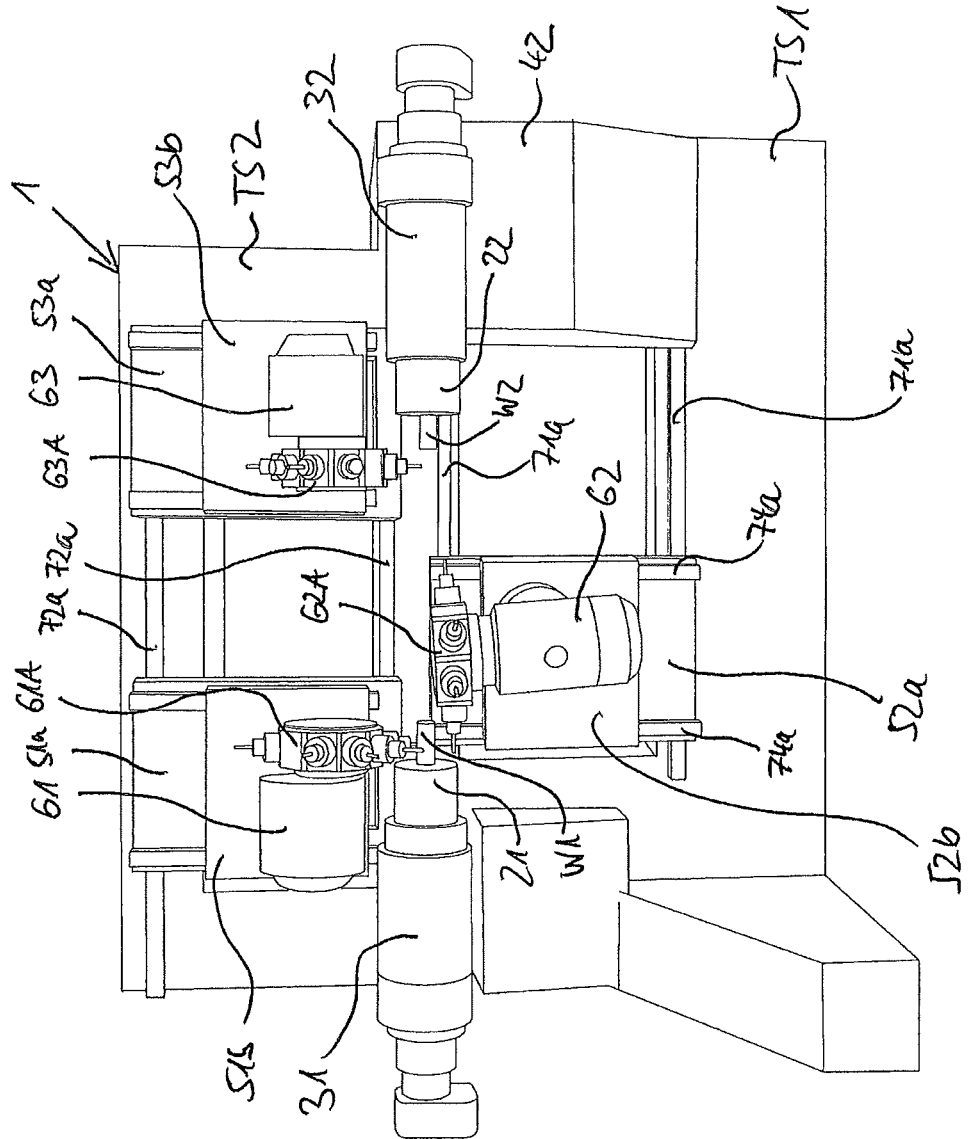
FIG. 10 shows by way of example a schematic diagram of a front view of a machine tool according to a third exemplary embodiment of the present invention.

FIG. 10 shows by way of example a schematic diagram of a front view of a machine tool according to a third exemplary embodiment of the present invention. Here, the design of the machine frame 1 differs from the above described machine frame design. In FIG. 10, all tool carrier slides and the spindles are advantageously arranged on the front side of the machine frame 1, and there is an excellent accessibility from the front to the machining area and onto the tool carrier slides and the spindles.

The first carrier side TS1 on which in this exemplary embodiment both the second tool carrier slide 52 including partial slides 52a and 52b and also the first spindle carrier slide 42 are arranged to as to be respectively guided on the guide rails 71a, and the second carrier side TS2 on which in this exemplary embodiment both the first tool carrier slide 51 including partial slides 51a and 51b and the second tool carrier slide 53 including partial slides 53a and 53b are arranged so as to be respectively guided on the guide rails 72a, are aligned in parallel. The design of the second tool carrier slide 52 is similar to the design from the preceding exemplary embodiments, wherein details, such as the hydraulic system including cylinders 52d, are not shown.

FIG. 11A shows by way of example a schematic diagram of a perspective front view of an alternative embodiment of the tool carrier slide 52 of the machine tool, said tool carrier slide being arranged between the spindle carriers 31 and 32, and FIG. 11B shows by way of example a schematic diagram of a perspective rear view of the alternative embodiment of the tool carrier slide 52 of the machine tool from FIG. 11A, said tool carrier slide being arranged between the spindle carriers 31 and 32. This design can be used in all of the above described exemplary embodiments.

The tool turret head 62A is arranged at the tool carrier body 62 which is connected to a quill carrier partial slide 52c. The partial slide 52c is guided in the Y-direction on the guide rails 79a by means of guide members 79b, wherein the guide rails 79a are mounted on the bottom side on the partial slide 52c.

The guide members 79b are mounted on the top side of the partial slide 52b. The partial slide 52b is guided on the guide rails 74a in the X-direction by means of guide members 74b, wherein the guide rails 74a are mounted on the rear side on the partial slide 52a. The partial slide 52b is arranged on the rear side of the partial slide 52a and the partial slide 52c which carries the tool carrier 62 extends from the partial slide 52b through a central opening of the partial slide 52a forwards to the tool carrier 62 which is disposed in front of the partial slide 52a.

Guide members 71b are in turn mounted on the four corners of the partial slide 52a. The partial slide 52a is guided on the guide rails 71a by means of said guide members in the Z-direction parallel to the spindle axes. Furthermore, a sliding bearing 72c is optionally provided for the Z-axis guidance and a sliding bearing 74c is provided for the X-axis guidance.

Figure 11C:
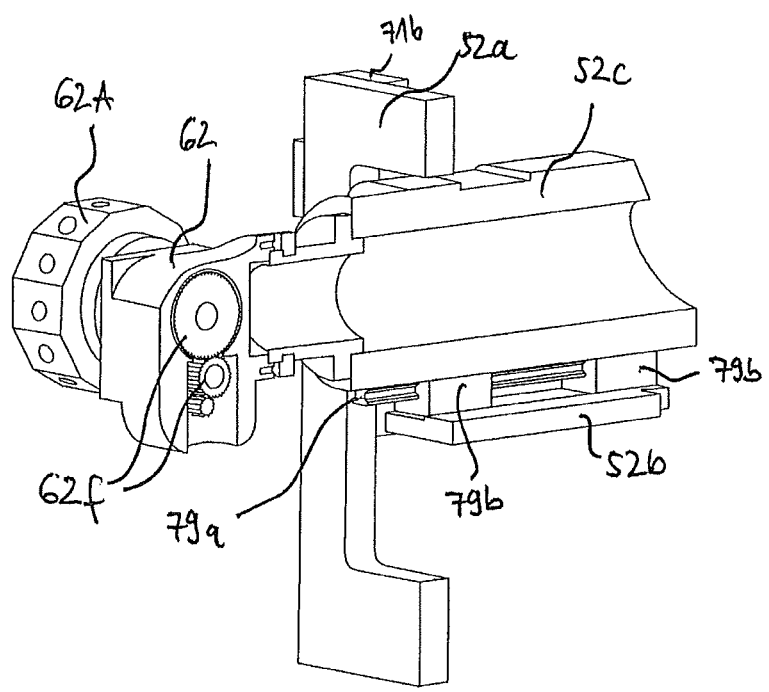
FIG. 11C shows by way of example a schematic diagram of a perspective sectional view of the alternative embodiment of the tool carrier of the machine tool from FIG. 11A, said tool carrier arranged between the spindle carriers.

FIG. 11C shows by way of example a schematic diagram of a perspective sectional view of the alternative embodiment of the tool carrier 62 from FIG. 11A. The tool carrier 62 comprises in its interior a transmission 62f for driving the rotation of the turret head 62A about the turret axis for aligning the tools and/or the tool holder. The tool carrier is mounted on the partial slide 52c. The guide rails 79a are mounted on the bottom side of the partial slide 52c and only one of them is shown in the sectional view.

Figure 11E:
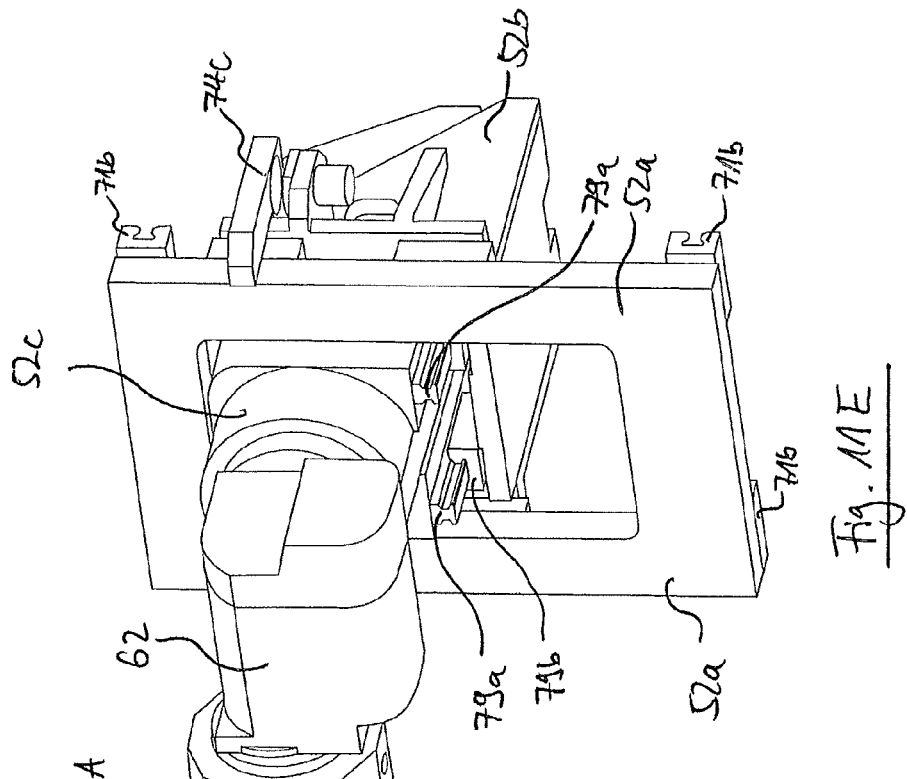
FIG. 11E shows by way of example a schematic diagram of a further perspective front view of the alternative embodiment of the tool carrier of the machine tool from FIG. 11A, said tool carrier being arranged between the spindle carriers.
Figure 11D:
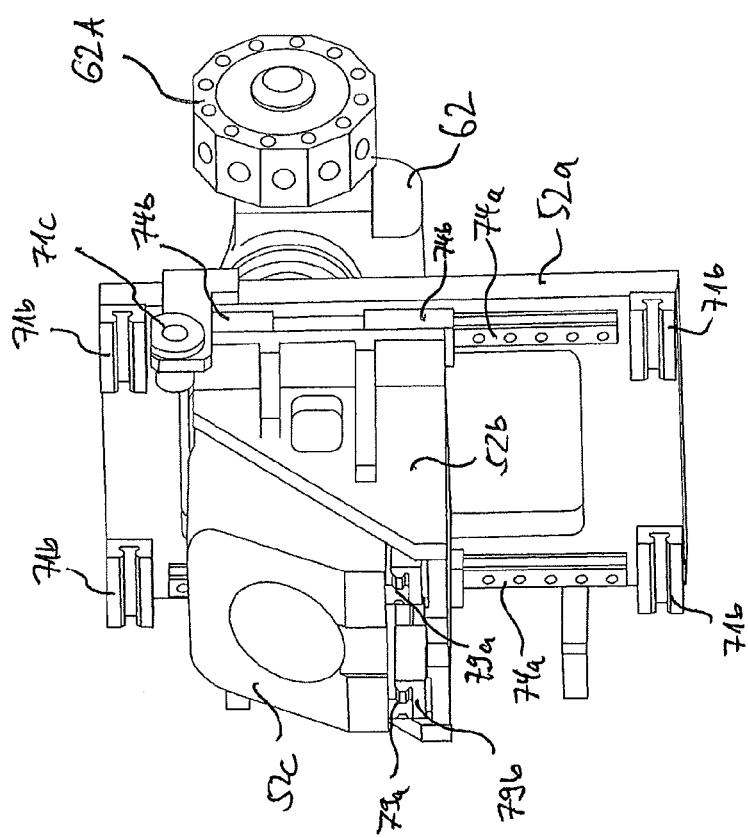
FIG. 11D shows by way of example a schematic diagram of a further perspective rear view of the alternative embodiment of the tool carrier of the machine tool from FIG. 11A, said tool carrier being arranged between the spindle carriers.
Figure 17:
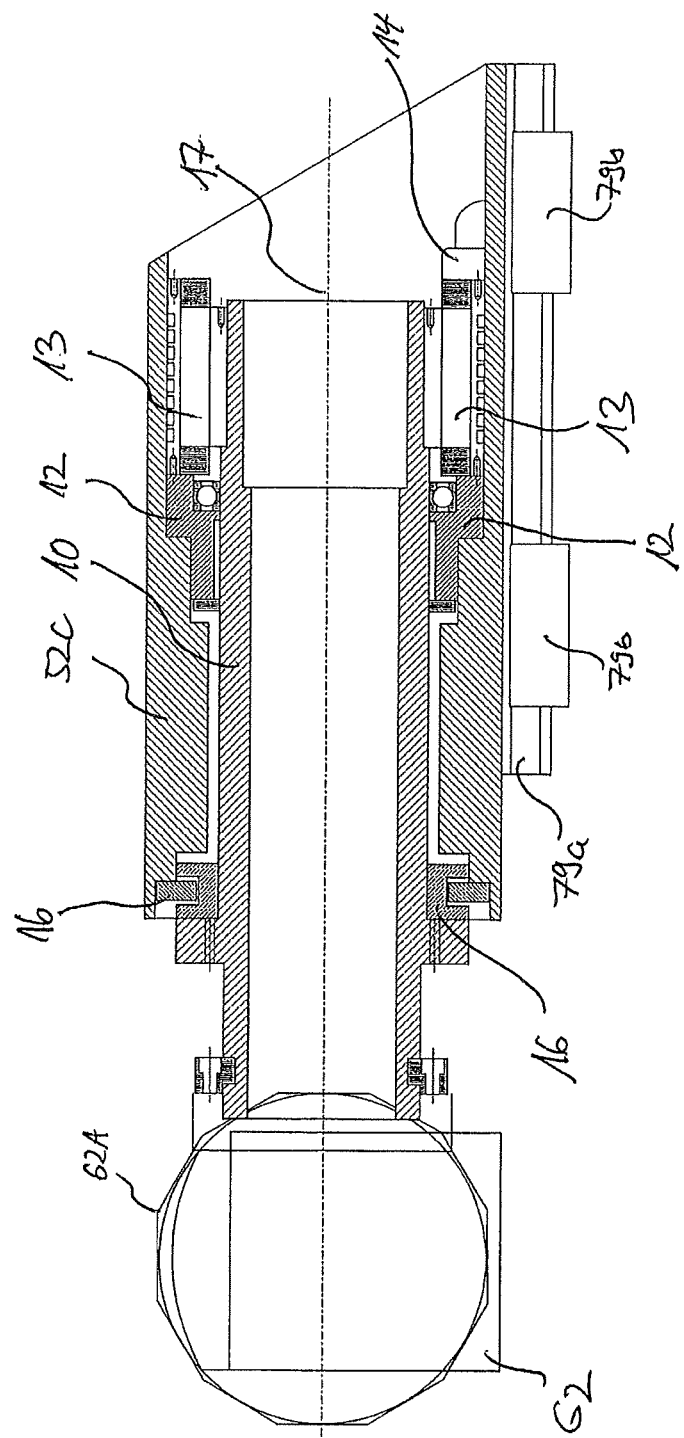

FIG. 11D shows by way of example a schematic diagram of a further perspective rear view of the alternative embodiment of the tool carrier slide 52 of the machine tool from FIG. 11A, and FIG. 11E shows by way of example a schematic view of a further perspective front view of the alternative embodiment of the tool carrier slide 52 of the machine tool from FIG. 11A.

FIG. 11F shows by way of example a schematic diagram of a sectional view of the alternative embodiment of the tool carrier 62 and of the partial slide 52c from FIG. 11A. Just as in the above described embodiment, the tool carrier 62 is attached to one end of a quill 10 (hollow shaft, can be also made as a solid shaft in further embodiments) the other end of which is accommodated in a hollow body of the quill carrier portion 52c which in this embodiment forms the quill carrier partial slide 52c by way of example.

Here, the quill 10 in the previous embodiment was supported both rotatably and movably. On account of the guidance by the guide rails 79a on the bottom side of the partial slide 52c in this embodiment, as a result of which the movability in the X-direction is ensured, the quill 10 in this embodiment is only supported so as to be rotatable in the hollow body of the partial slide 52c but cannot be moved in the Y-direction. In order to drive the rotational axis B by means of which the quill 10 can be rotated about the axis of rotation of the rotational axis B, a torque motor 13 is provided. The position of the rotational axis B, i.e. the rotatory position of the quill 10, can be monitored via an incremental encoder 14. A hydraulic brake 12 is adapted to fix the rotatory position of the rotational axis B, if required. Furthermore, a precision bearing 16 is arranged at the end of the partial slide 52c to support the quill 10.

In summary, the present invention enables the provision of a machine tool, in particular a lathe, so as to render possible the more efficient machining of the workpieces with the largest possible number of tools usable at the same time, if possible, with the highest possible degree of flexibility as regards the control of the relative movements between the tools and the tools accommodated in the work spindle while the design of the machine tool is simultaneously compact and cost-effective but rigid, and with a machining area which can be accessed very well by the processor or operator of the machine tool.

| Reference Signs | |
|---|---|
| machine frame | 1 |
| first carrier side | TS1 |
| second carrier side | TS2 |
| first carrier portion | 1a |
| middle carrier portion | 1c |
| second carrier portion | 1b |
| guide rails (on the first carrier side) | 71a |
| guide members (for rails 71a) | 71b |
| guide rails (on the second carrier side) | 72a |
| guide members (for rails 72a) | 72b |
| sliding bearing | 72c |
| first work spindle | 21 |
| first spindle carrier | 31 |
| second work spindle | 22 |
| second spindle carrier | 32 |
| spindle carrier slide | 42; 42a, 42b |
| axis drive housing | 42c |
| guide rails (on partial slide 42a) | 78a |
| guide members (for rails 77a) | 78b |
| guide rails (at spindle carrier 32) | 77a |
| guide members (for rails 77a) | 77b |
| tailstock slide | 82 |
| tailstock | 92 |
| centering tip | 92a |
| first tool carrier slide | 51a, 51b, 51c |
| first tool carrier | 61 |
| first tool turret | 61A |
| guide rails (on partial slide 51b) | 73a |
| guide members (for rails 73a) | 73b |
| guide rails (on partial slide 51a) | 76a |
| guide members (for rails 76a) | 76b |
| second tool carrier slide | 52a, 52b, 52c |
| hydraulic cylinder | 52d |
| hydraulic piston | 52e |
| axis drive housing | 52f |
| axis drive housing | 52g |
| second tool carrier | 62 |
| second tool turret | 62A |
| axial tool holder unit | 62a |
| radial tool holder unit | 62b |
| tool holder | 62c |
| tool holder support | 62d |
| transmission | 62f |
| guide rails (on partial slide 52a) | 74a |
| guide members (for rails 74a) | 74b |
| sliding bearing | 74c |
| guide shaft | 74d |
| guide rails (on partial slide 52c) | 79a |
| guide members (for rails 79a) | 79b |
| quill | 10 |
| bearing bush | 11 |
| hydraulic brake | 12 |
| torque drive | 13 |
| incremental encoder | 14 |
| hydraulic connection | 15 |
| precision bearing | 16 |
| axis of rotation | 17 |
| third tool carrier slide | 53a, 53b, 53c |
| third tool carrier | 63 |
| third tool turret | 63A |
| guide rails (on partial slide 53b) | 75a |
| guide members (for rails 75a) | 75b |

The invention claimed is:

1. A machine tool comprising:
a machine frame having a first carrier side and a second carrier side, wherein the machine frame includes a first carrier portion, a second carrier portion and a middle carrier portion which is arranged between the first and second carrier portions;
a first spindle carrier which is arranged on the first carrier side of the first carrier portion and which holds a first work spindle to receive a first workpiece;
a first tool carrier slide which is arranged on the second carrier side of the first carrier portion and on which a first tool carrier for tools is arranged to machine the first workpiece;
a first spindle carrier slide which is arranged on the first or second carrier side of the second carrier portion and on which a second spindle carrier is arranged which holds a second work spindle that faces the first work spindle to receive a second workpiece, wherein the spindle axis of the second work spindle is aligned in parallel, in particular coaxially, to the spindle axis of the first work spindle and wherein the second spindle carrier is movable in a direction parallel to the spindle axes; and
a second tool carrier slide which is arranged on the first carrier side of the middle portion and on which a second tool carrier for tools is arranged to machine the first or second workpiece,
wherein the second tool carrier slide on the first carrier side is arranged between the first spindle carrier and the second spindle carrier,
wherein the second tool carrier is movable in a first direction parallel to the spindle axes of the first and second work spindles,
wherein the second tool carrier slide also comprises a spin axis, by means of which the second tool carrier can be controlled so as to be rotated about an axis of rotation aligned transversely to the spindle axes, and
wherein the second tool carrier comprises a tool turret which has a tool-carrying tool turret head that is rotatably mounted about a turret axis aligned transversely to the axis of rotation.

2. The machine tool of claim 1 wherein the tool turret is arranged on the second tool carrier so as to be displaced relative to the axis of rotation of the spin axis, in particular on the second tool carrier so as to be eccentric relative to the axis of rotation of the spin axis.

3. The machine tool of claim 1 wherein:
the turret axis of the tool turret head can be aligned by rotating the second tool carrier about the spin axis transversely, in particular perpendicularly, to the spindle axes,
the turret axis of the tool turret head can be aligned by rotating the second tool carrier about the spin axis parallel to the spindle axes, and/or
the turret axis of the tool turret head can be aligned by rotating the second tool carrier about the spin axis at any angle relative to the spindle axes.

4. The machine tool of claim 1 wherein the tool turret head has a plurality of supports for receiving tools or tool-holding tool holders, wherein the supports are in particular adapted to receive radial tool holders that hold tools radially relative to the turret axis and to receive axial tool holders that hold tools axially relative to the turret axis.

5. The machine tool of claim 4 wherein the second tool carrier is adapted to align a support of the tool turret head by rotation of the tool turret head about the turret axis to a workpiece received at one of the work spindles, and wherein the supports are arranged in pairs each relative to the turret axis on opposite sides on the tool turret head in such a way that one support each can be aligned with the second work spindle by aligning another opposite support with the first work spindle when the turret axis is aligned transversely to the spindle axes.

6. The machine tool of claim 1 wherein the second tool carrier slide is made as a compound slide and the second tool carrier is also movable in a second direction transversely to the spindle axis of the first and second work spindles.

7. The machine tool of claim 6 wherein the second tool carrier slide comprises a linear axis by means of which the second tool carrier is also movable in a third direction transversely to the spindle axes of the first and second work spindles and transversely to the second direction.

8. The machine tool of claim 7 wherein the linear axis of the second tool carrier slide comprises a retractable and extendable quill which is supported so as to be movable in a quill carrier portion of the second tool carrier slide.

9. The machine tool of claim 8 wherein the quill is also supported so as to be rotatable in a quill carrier portion of the second tool carrier slide and forms the spin axis B of the second tool carrier.

10. The machine tool of claim 1 wherein a second spindle carrier slide that is movable in the direction of the spindle axes, that is arranged on the first carrier side of the first carrier portion, and on which the first spindle carrier of the first work spindle is held.

11. The machine tool of claim 1 wherein a tailstock slide movable in a direction parallel to the spindle axes is arranged at the first or second spindle carrier and carries a tailstock having a tailstock tip.

12. The machine tool of claim 1 wherein the first spindle carrier slide is arranged on the first carrier side wherein guideways aligned parallel to the spindle axes are arranged on the first carrier side of the middle carrier portion and of the second carrier portion, and on which the second tool carrier slide and the first spindle carrier slide are guided so as to be movable in a direction parallel to the spindle axes.

13. The machine tool of claim 12, further comprising a third tool carrier slide which is arranged on the second carrier side of the second carrier portion, and on which a third tool carrier for tools is arranged to machine the second workpiece.

14. The machine tool of claim 13 wherein the first tool carrier slide and the third tool carrier slide are movable in a direction parallel to the spindle axes.

15. The machine tool of claim 14 wherein guideways aligned in a direction parallel to the spindle axes are arranged on the second carrier side, which extend from the first carrier portion via the middle carrier portion to the second carrier portion and on which the first tool carrier slide and the third tool carrier slide are guided so as to be movable in a direction parallel to the spindle axes.

16. The machine tool of claim 1 wherein the first spindle carrier slide is arranged on the second carrier side, wherein guideways aligned in a direction parallel to the spindle axes are arranged on the second carrier side, which extend from the first carrier portion via the middle carrier portion to the second carrier portion on which the first tool carrier slide and the first spindle carrier slide are guided so as to be movable in a direction parallel to the spindle axes.

17. The machine tool of claim 16 wherein the first spindle carrier slide is made as a compound slide and comprises a first spindle carrier partial slide which is movable in a direction parallel to the spindle axes and a second spindle carrier partial slide which is arranged on the first spindle carrier partial slide so as to be movable in a direction transversely to the spindle axes.

18. The machine tool of claim 17 wherein the direction transversely to the spindle axes of the second work spindle is aligned in parallel to a perpendicular which perpendicularly intersects the spindle axes and the tailstock axis in such a way that, by moving the first spindle carrier slide in a direction transversely to the spindle axes, both the spindle axes can be aligned coaxially with one another and the spindle axis of the first work spindle can be aligned coaxially with the tailstock axis of the tailstock.

19. The machine tool of claim 1 wherein the first tool carrier slide and/or a third tool carrier slide arranged on the second carrier side are made as a double compound slide, wherein a first partial slide is arranged so as to be movable in a direction parallel to the spindle axes, a second partial slide is arranged so as to be movable in a direction transversely to the spindle axes, and a third partial slide is arranged so as to be movable in a direction transversely to the spindle axes and transversely to the moving direction of the second partial slide.

20. The machine tool of claim 1 wherein the first carrier side clamps a first plane and the second carrier side clamps a second plane, wherein the first plane is aligned parallel or perpendicularly to the second plane.

21. The machine tool of claim 20 wherein the axis of rotation of the spin axis is aligned substantially perpendicularly to the first plane.

22. The machine tool of claim 1 wherein the first carrier side clamps a first plane and the second carrier side clamps a second plane, and wherein the first plane is aligned so as to be inclined relative to the second plane.

23. The machine tool of claim 22 wherein:
   a first side of the first spindle carrier partial slide, which faces the second carrier side, clamps a third plane which is aligned parallel to the second plane, and
   a second side of the first spindle carrier partial slide, which faces the second spindle carrier partial slide, clamps a fourth plane which is aligned parallel to the first plane, wherein the first spindle carrier partial slide is made in particular as a wedge-type slide in such a way that the second spindle carrier partial slide is arranged on the first spindle carrier partial slide so as to be movable in particular parallel to the first plane.

24. The machine tool of claim 22 wherein a first side of the second partial slide, which faces the first partial slide on the second carrier side, clamps a fifth plane which is aligned parallel to the second plane and a second side of the second partial slide, which faces the third partial slide, clamps a sixth plane which is aligned parallel to the first plane, wherein the second partial slide is made in particular as a wedge-type slide in such a way that the third partial slide is arranged on the second partial slide so as to be movable in particular parallel to the first plane.

\* \* \* \* \*